US011902616B2

(12) United States Patent
Uno

(10) Patent No.: US 11,902,616 B2
(45) Date of Patent: *Feb. 13, 2024

(54) AUDIO-VISUAL DEVICE

(71) Applicant: D&M Holdings, Inc., Kanagawa (JP)

(72) Inventor: Hiroyuki Uno, Kanagawa (JP)

(73) Assignee: D&M HOLDINGS, INC., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,823

(22) Filed: Dec. 13, 2021

(65) Prior Publication Data

US 2022/0121539 A1 Apr. 21, 2022

Related U.S. Application Data

(63) Continuation of application No. 16/335,439, filed as application No. PCT/JP2017/011755 on Mar. 23, 2017, now Pat. No. 11,234,045.

(30) Foreign Application Priority Data

Sep. 29, 2016 (JP) ................................. 2016-192178

(51) Int. Cl.
*H04N 21/436* (2011.01)
*G06F 11/07* (2006.01)
(Continued)

(52) U.S. Cl.
CPC ....... *H04N 21/436* (2013.01); *G06F 11/0709* (2013.01); *G06F 11/2221* (2013.01);
(Continued)

(58) Field of Classification Search
CPC ................ H04N 21/436; H04N 21/442; G06F 11/0709; G06F 11/2221; G09G 5/006; G09G 2370/12
(Continued)

(56) References Cited

U.S. PATENT DOCUMENTS 6,385,739 B1   5/2002   Barton
7,634,797 B2  12/2009   Yun
(Continued)

FOREIGN PATENT DOCUMENTS

EP        1860879 A1    11/2007
JP      2003259241      9/2003
(Continued)

OTHER PUBLICATIONS

Wikipedia GUI page, retrieved from https://en.wikipedia.org/wiki/Graphical_user_interface (Year: 2022).*

(Continued)

*Primary Examiner* — Yair Leibovich
(74) *Attorney, Agent, or Firm* — Peter A. Nieves; Nieves IP Law Group, LLC

(57) ABSTRACT

Provided is a technology for supporting solution of a fault that has occurred in a system including an audio-visual device. A solution support program storage unit (7) is configured to store, for each potential fault, a solution support program for supporting a user's job for solving the each fault. At least one of the solution support programs for handling a fault having a plurality of possible causes includes processing for displaying a message for prompting the user to conduct a predetermined job, processing for displaying a question for the user, processing for receiving a user's answer to the question, and processing for displaying a message indicating a solution corresponding to the received answer. Then, a main control unit (9) determines a fault based on the information acquired through an audio-visual signal input interface unit (3) and an audio-visual signal output interface unit (4), and executes the solution support program for handling the determined fault.

21 Claims, 18 Drawing Sheets

(51) Int. Cl.
  *G09G 5/00* (2006.01)
  *H04N 21/442* (2011.01)
  *G06F 11/22* (2006.01)

(52) U.S. Cl.
  CPC ........... *G09G 5/006* (2013.01); *H04N 21/442* (2013.01); *G09G 2330/12* (2013.01); *G09G 2370/12* (2013.01)

(58) Field of Classification Search
  USPC .......................................................... 714/46
  See application file for complete search history.

(56) References Cited

U.S. PATENT DOCUMENTS

| | | | |
|---|---|---|---|
| 7,755,503 | B2 | 7/2010 | Bonorden et al. |
| 8,160,424 | B2 | 4/2012 | Cha et al. |
| 8,212,826 | B1* | 7/2012 | Williams ............. H04N 17/004 |
| | | | 386/231 |
| 8,285,223 | B2 | 10/2012 | Unger |
| 8,286,210 | B2 | 10/2012 | Boyden et al. |
| 8,863,210 | B2 | 10/2014 | Kwon |
| 8,918,544 | B2 | 12/2014 | Chardon et al. |
| 8,937,664 | B2 | 1/2015 | Kwon et al. |
| 8,984,324 | B2 | 3/2015 | Shintani |
| 9,008,164 | B2 | 4/2015 | Hong et al. |
| 9,124,853 | B2 | 9/2015 | Vanderhoff et al. |
| 9,204,085 | B2 | 12/2015 | Sato et al. |
| 9,215,454 | B2 | 12/2015 | Zhou |
| 9,277,171 | B2 | 3/2016 | Toba et al. |
| 9,307,204 | B1 | 4/2016 | Garg et al. |
| 9,344,669 | B2 | 5/2016 | Zhang et al. |
| 2002/0104039 | A1* | 8/2002 | DeRolf ............... G06F 11/2257 |
| | | | 714/30 |
| 2003/0090590 | A1 | 5/2003 | Yoshizawa et al. |
| 2004/0153823 | A1* | 8/2004 | Ansari ................. G06F 11/0793 |
| | | | 714/38.14 |
| 2004/0225381 | A1 | 11/2004 | Ritz et al. |
| 2006/0095623 | A1 | 5/2006 | Nio et al. |
| 2006/0197841 | A1 | 9/2006 | Young et al. |
| 2007/0055876 | A1 | 3/2007 | Choi |
| 2008/0239082 | A1 | 10/2008 | Zhu |
| 2009/0015723 | A1 | 1/2009 | Doumuki |
| 2009/0307734 | A1 | 12/2009 | Doi et al. |
| 2010/0229022 | A1 | 9/2010 | Anand et al. |
| 2014/0003794 | A1 | 1/2014 | Toshiba et al. |
| 2014/0253673 | A1 | 9/2014 | Barredo |
| 2015/0281761 | A1* | 10/2015 | Mank ................. H04N 21/4227 |
| | | | 725/37 |
| 2016/0140075 | A1 | 5/2016 | Kashyap et al. |

FOREIGN PATENT DOCUMENTS

| | | |
|---|---|---|
| JP | 4020162 | 12/2007 |
| JP | 2014011734 | 1/2014 |
| JP | 2014017819 | 1/2014 |
| JP | 2014202699 | 10/2014 |
| WO | 2004107750 | 12/2004 |

OTHER PUBLICATIONS

Hideo Nagano "All about high speed video interface HDMI & DisplayPort", 2nd edition, CQ Publishing Co., Ltd., Apr. 1, 2014.
Wikipedia "system" page, retrieved from https://en.wikipedia.org/wiki/System#in_engineering_and_physics (Year: 2021).
Wikipedia "device" page, retrieved from https://en.wikipedia.org/wiki/Device (Year: 2021).

* cited by examiner

FIG. 2

FAULT MANAGEMENT TABLE 70

| FAULT ID | FAULT TARGET | FAULT DETAIL |
|---|---|---|
| H1-01 | INTERNAL DEVICE | COMMUNICATION ERROR WITH RESPECT TO HDMI INPUT PORTION 30 |
| H1-02 | INTERNAL DEVICE | COMMUNICATION ERROR WITH RESPECT TO DAI INPUT PORTION 31 |
| H1-03 | INTERNAL DEVICE | COMMUNICATION ERROR WITH RESPECT TO HDMI OUTPUT PORTION 40 |
| H1-04 | INTERNAL DEVICE | COMMUNICATION ERROR WITH RESPECT TO ANALOG OUTPUT UNIT 41 |
| H1-05 | INTERNAL DEVICE | COMMUNICATION ERROR WITH RESPECT TO VIDEO SIGNAL PROCESSING UNIT 5 |
| H1-06 | INTERNAL DEVICE | COMMUNICATION ERROR WITH RESPECT TO AUDIO SIGNAL PROCESSING UNIT 6 |
| H1-07 | INTERNAL DEVICE | COMMUNICATION ERROR WITH RESPECT TO ANOTHER INTERNAL DEVICE |
| V1-01 | HDMI-COMPATIBLE INPUT DEVICE SIDE | ERROR IN DETECTION OF SUPPLY VOLTAGE |
| V1-02 | HDMI-COMPATIBLE INPUT DEVICE SIDE | UNLOCKED PLL OF TMDS |
| V1-03 | HDMI-COMPATIBLE INPUT DEVICE SIDE | HDCP ERROR |
| V1-04 | HDMI-COMPATIBLE INPUT DEVICE SIDE | QUALITY ERROR OF TMDS |
| V1-05 | HDMI-COMPATIBLE INPUT DEVICE SIDE | SCDT TURNED OFF WITH LOCKED PLL OF TMDS |
| V1-06 | HDMI-COMPATIBLE INPUT DEVICE SIDE | VIDEO INFORMATION ERROR |
| V1-07 | HDMI-COMPATIBLE INPUT DEVICE SIDE | VIDEO TIMING ERROR |
| V1-08 | HDMI-COMPATIBLE INPUT DEVICE SIDE | MISMATCH IN RESOLUTION WITH HDMI-COMPATIBLE OUTPUT DEVICE |
| V1-09 | HDMI-COMPATIBLE INPUT DEVICE SIDE | MUTE OF AUDIO-VISUAL SIGNAL IS CONSTANTLY ON |
| V1-10 | HDMI-COMPATIBLE INPUT DEVICE SIDE | STREAM ID TYPE ERROR |
| V2-01 | HDMI-COMPATIBLE OUTPUT DEVICE SIDE | HOT PLUG DETECTION SIGNAL IS CONSTANTLY LOW |
| V2-02 | HDMI-COMPATIBLE OUTPUT DEVICE SIDE | VOLTAGE DETECTION SIGNAL IS CONSTANTLY LOW |
| V2-03 | HDMI-COMPATIBLE OUTPUT DEVICE SIDE | ERROR IN ACQUISITION OF EDID |
| V2-04 | HDMI-COMPATIBLE OUTPUT DEVICE SIDE | HOT PLUG DETECTION SIGNAL CONTINUOUSLY INCLUDES WARNING |
| V2-05 | HDMI-COMPATIBLE OUTPUT DEVICE SIDE | VOLTAGE DETECTION SIGNAL CONTINUOUSLY INCLUDES WARNING |
| V2-06 | HDMI-COMPATIBLE OUTPUT DEVICE SIDE | HDCP ERROR |
| A1-01 | HDMI-COMPATIBLE OUTPUT DEVICE SIDE | NO AUDIO PACKET |
| A1-02 | HDMI-COMPATIBLE OUTPUT DEVICE SIDE | INVALID DEVICE INFORMATION |
| A1-03 | HDMI-COMPATIBLE OUTPUT DEVICE SIDE | MISMATCH IN INFORMATION WITH AUDIO SIGNAL PROCESSING UNIT 6 |

PG-12 SOLUTION SUPPORT PROGRAM

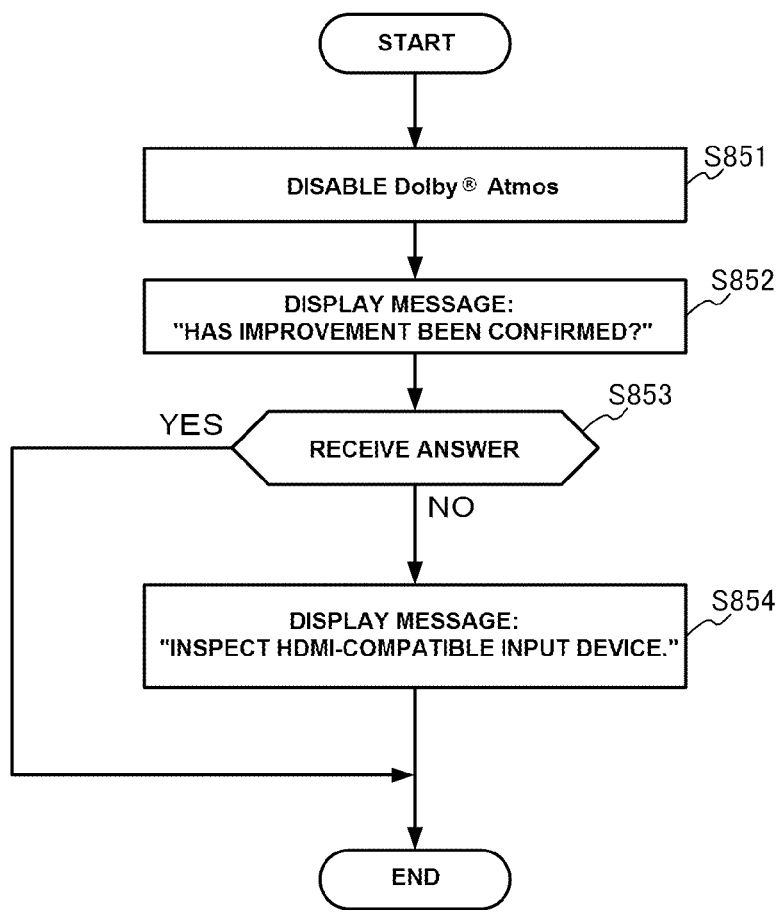

AUDIO-VISUAL DEVICE

CROSS-REFERENCE TO RELATED APPLICATIONS

This application is a continuation of U.S. application Ser. No. 16/335,439, filed Mar. 21, 2019 and entitled AUDIO-VISUAL DEVICE, which is a US national stage application of PCT/JP2017/011755, filed Mar. 23, 2017 and entitled AUDIO-VISUAL DEVICE, which claims priority to Japanese Application Number 2016-192178, filed Sep. 29, 2016. The disclosure of the prior applications are incorporated by reference herein in their entirety.

TECHNICAL FIELD

The present invention relates to an audio-visual device for inputting and outputting an audio-visual signal, and more particularly, to a technology for supporting solution of a fault that has occurred in a system including an audio-visual device.

BACKGROUND ART

In recent years, audio-visual devices including an interface that allows two-way communications, e.g., a high-definition multimedia interface (HDMI, which is a registered trademark), are becoming widespread. For example, in Patent Literature 1, there is disclosed a video and audio reproduction apparatus for supporting solution of a connection error or setting error made by a user by determining present events based on information acquired through the HDMI and displaying a message corresponding to the determined event.

CITATION LIST

Patent Literature

[PTL 1] JP 4020162 B1

SUMMARY OF INVENTION

Technical Problem

However, in the video and audio reproduction apparatus disclosed in Patent Literature 1, the event may fail to be improved even when the connection or setting is reviewed based on the displayed message. For example, in a case where there are a plurality of possible causes of a given event, the given event may fail to be improved even when a job for solving one of the causes is conducted based on the message.

The present invention has been made in view of the above-mentioned circumstances, and has an object to provide a technology for supporting solution of a fault that has occurred in a system including an audio-visual device.

Solution to Problem

In order to achieve the above-mentioned object, in one embodiment of the present invention, each potential fault is provided in advance with a solution support program for supporting a user's job for solving the fault. In this case, it is assumed that the solution support program for a fault having a plurality of possible causes includes processing for outputting a message for prompting the user to conduct a predetermined job, processing for outputting a question for the user, processing for receiving the user's answer to the question, and processing for outputting a message indicating a solution corresponding to the received answer. Then, a fault is determined based on information acquired through an input and output interface for an audio-visual signal, and the solution support program for handling the determined fault is executed.

For example, according to one embodiment of the present invention, there is provided an audio-visual device, including:

an input and output interface for an audio-visual signal;
a man-machine interface;
solution support program storage means for storing, for each potential fault, a solution support program for supporting a user's job for solving the each potential fault;
fault determination means for determining a fault based on information acquired through the input and output interface; and
solution support program execution means for executing the solution support program for handling the fault determined by the fault determination means after reading the solution support program from the solution support program storage means,
in which among the solution support programs stored in the solution support program storage means, the solution support program for handling a fault having a plurality of possible causes includes:
processing for outputting a message for prompting the user to conduct a predetermined job to the man-machine interface;
processing for outputting a question for the user to the man-machine interface;
processing for receiving a user's answer to the question displayed on the man-machine interface through the man-machine interface; and
processing for outputting a message indicating a solution corresponding to the user's answer received through the man-machine interface to the man-machine interface.

Advantageous Effects of Invention

In one embodiment of the present invention, a fault is determined based on the information acquired through the input and output interface for the audio-visual signal, and the solution support program for handling the determined fault is executed. In this case, the solution support program for handling a fault having a plurality of possible causes includes the processing for outputting the message for prompting the user to conduct the predetermined job, the processing for outputting the question for the user, the processing for receiving the user's answer to the question, and the processing for outputting the message indicating the solution corresponding to the received answer. Thus, the solution to the fault having a plurality of possible causes is determined through a dialogue with the user, and hence a more appropriate solution is more likely to be found. Thus, according to the present invention, it is possible to more appropriately support the solution of the fault that has occurred in the system including the audio-visual device.

BRIEF DESCRIPTION OF DRAWINGS

FIG. 2 is a table for schematically showing a fault management table 70.

FIG. 18 is a diagram for illustrating an operation flow achieved when a solution support program PG-14 is executed by the main control unit 9 (S850 of FIG. 13).

DESCRIPTION OF EMBODIMENTS

Now, one embodiment of the present invention is described with reference to the accompanying drawings.

An audio-visual device 1 according to this embodiment is configured to apply a special effect as necessary to an audio-visual signal input from an HDMI-compatible input device, e.g., a Blu-ray (registered trademark) Disc player or a digital television broadcast tuner, which includes an HDMI interface, and to output the audio-visual signal to an HDMI-compatible output device, e.g., a monitor or a speaker, which includes an HDMI interface.

Figure 1:
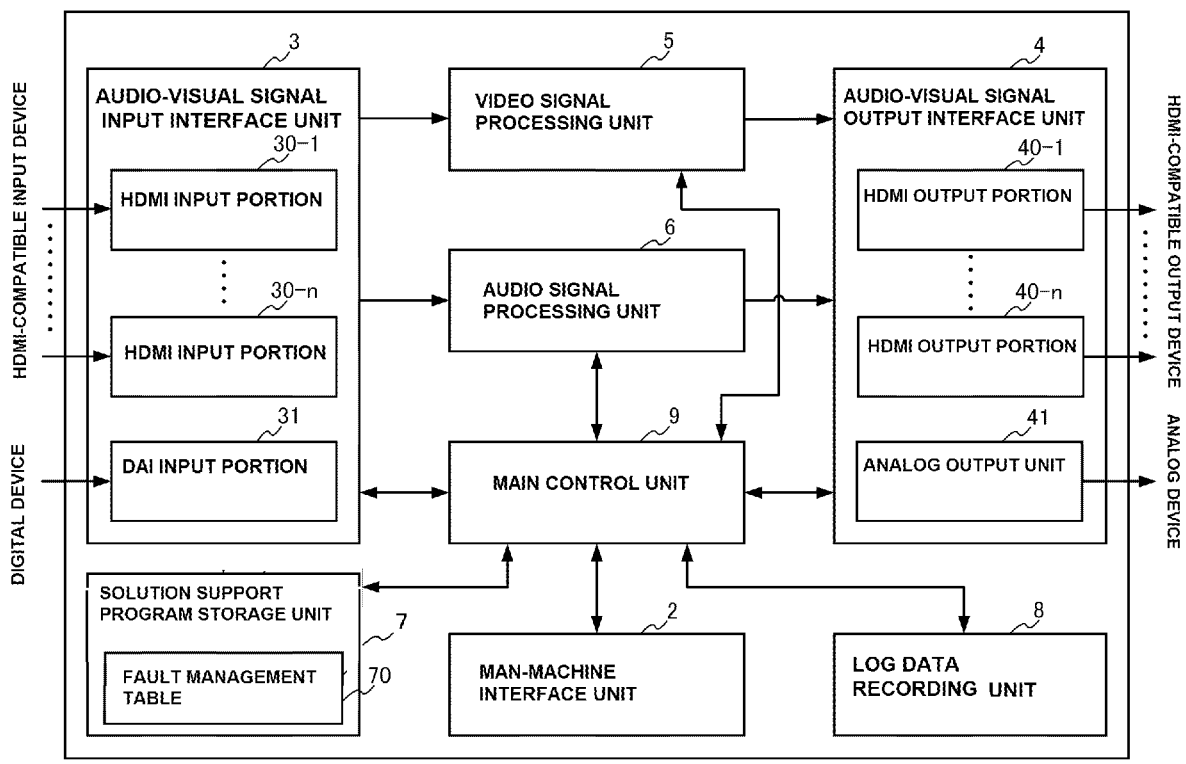
FIG. 1 is a schematic block diagram of an audio-visual device 1 according to one embodiment of the present invention.

FIG. 1 is a schematic block diagram of the audio-visual device 1 according to this embodiment.

As illustrated in FIG. 1, the audio-visual device 1 includes a man-machine interface unit 2, an audio-visual signal input interface unit 3, an audio-visual signal output interface unit 4, a video signal processing unit 5, an audio signal processing unit 6, a solution support program storage unit 7, a log data recording unit 8, and a main control unit 9.

The man-machine interface unit 2 is an interface for displaying information and receiving various instructions from a user, and includes an input device including various switches and buttons and a display device including a liquid crystal display. The display device may serve as an input device including a touch panel.

The audio-visual signal input interface unit 3 is an interface for inputting an audio-visual signal to the audio-visual device 1, and includes at least one of HDMI input portions 30-1 to 30-$n$ (hereinafter also referred to simply as "HDMI input portion 30") and a digital audio interface (DAI) input portion 31.

The HDMI input portion 30 is an interface for inputting an HDMI signal from the HDMI-compatible input device, and is configured to extract a digital video signal and the digital audio signal included in the HDMI signal input from the HDMI-compatible input device through an HDMI cable (not shown) connected to the HDMI input portion 30, and to output the digital video signal and the digital audio signal to the video signal processing unit 5 and the audio signal processing unit 6, respectively.

The DAI input portion 31 is an interface for inputting a digital audio signal from a digital device, e.g., a digital versatile disc (DVD) player, which includes a digital audio interface, and is configured to output the digital audio signal input from the digital device through a digital cable (not shown) connected to the DAI input portion 31 to the audio signal processing unit 6.

The audio-visual signal output interface unit 4 is an interface for outputting an audio-visual signal from the audio-visual device 1, and includes at least one of HDMI output portions 40-1 to 40-$n$ (hereinafter also referred to simply as "HDMI output portion 40") and an analog output unit 41.

The HDMI output portion 40 is an interface for outputting an HDMI signal to the HDMI-compatible output device, and is configured to generate an HDMI signal including the digital video signal input from the video signal processing unit 5 and the digital audio signal input from the audio signal processing unit 6, and to output the HDMI signal to the HDMI-compatible output device through an HDMI cable (not shown) connected to the HDMI output portion 40.

The analog output unit 41 is an interface for outputting an analog audio signal to an analog device, e.g., an analog speaker, and is configured to convert the digital audio signal input from the audio signal processing unit 6 into an analog audio signal, and to output the analog audio signal to the analog device through an analog cable (not shown) connected to the analog output unit 41.

The video signal processing unit 5 is configured to conduct video processing, e.g., on-screen display for the digital video signal input from the audio-visual signal input interface unit 3 as necessary, and to output the digital video signal to the audio-visual signal output interface unit 4.

The audio signal processing unit 6 is configured to conduct acoustic processing, e.g., equalizing and filtering for the digital audio signal input from the audio-visual signal input interface unit 3 as necessary, and to output the digital audio signal to the audio-visual signal output interface unit 4.

The solution support program storage unit 7 is configured to store, for each potential fault, a solution support program for supporting a user's job for solving the each potential fault along with a fault management table 70 for describing information relating to the potential fault.

FIG. 2 is a table for schematically showing the fault management table 70.

As shown in FIG. 2, in the fault management table 70, a record 700 relating to each potential fault is registered for the each potential fault. The record 700 includes a field 701 for registering a fault ID (error code) for identifying a fault, a field 702 for registering a fault target in which a fault has occurred, and a field 703 for registering a fault detail. In the field 702, the "internal device" indicates that a fault has occurred in an internal device of the audio-visual device 1, the "HDMI-compatible input device side" indicates that a fault has occurred in the HDMI-compatible input device or the HDMI cable connected to the HDMI-compatible input device, and the "HDMI-compatible output device side" indicates that a fault has occurred in the HDMI-compatible output device or the HDMI cable connected to the HDMI-compatible output device.

The log data recording unit 8 is configured to record log data on self-diagnosis processing described later, which is conducted by the main control unit 9.

The main control unit 9 is configured to centrally control the respective components 2 to 8 of the audio-visual device 1. Specifically, the main control unit 9 outputs, based on the user's instruction input through the man-machine interface unit 2, the digital video signal extracted from the HDMI signal input from a desired HDMI input portion 30 to a desired HDMI output portion 40 through the video signal processing unit 5, and instructs the video signal processing unit 5 to conduct desired video processing. Further, the main control unit 9 outputs, based on the user's instruction input through the man-machine interface unit 2, the digital audio signal extracted from the HDMI signal input to a desired HDMI input portion 30 or the digital audio signal input to the DAI input portion 31 to a desired HDMI output portion 40 or the analog output unit 41 through the audio signal processing unit 6, and instructs the audio signal processing unit 6 to conduct desired acoustic processing.

The main control unit 9 further conducts the self-diagnosis processing for determining a solution to a fault caused in an audio-visual system including the audio-visual device 1 through a dialogue with the user based on the user's instruction input through the man-machine interface unit 2.

Figure 3:
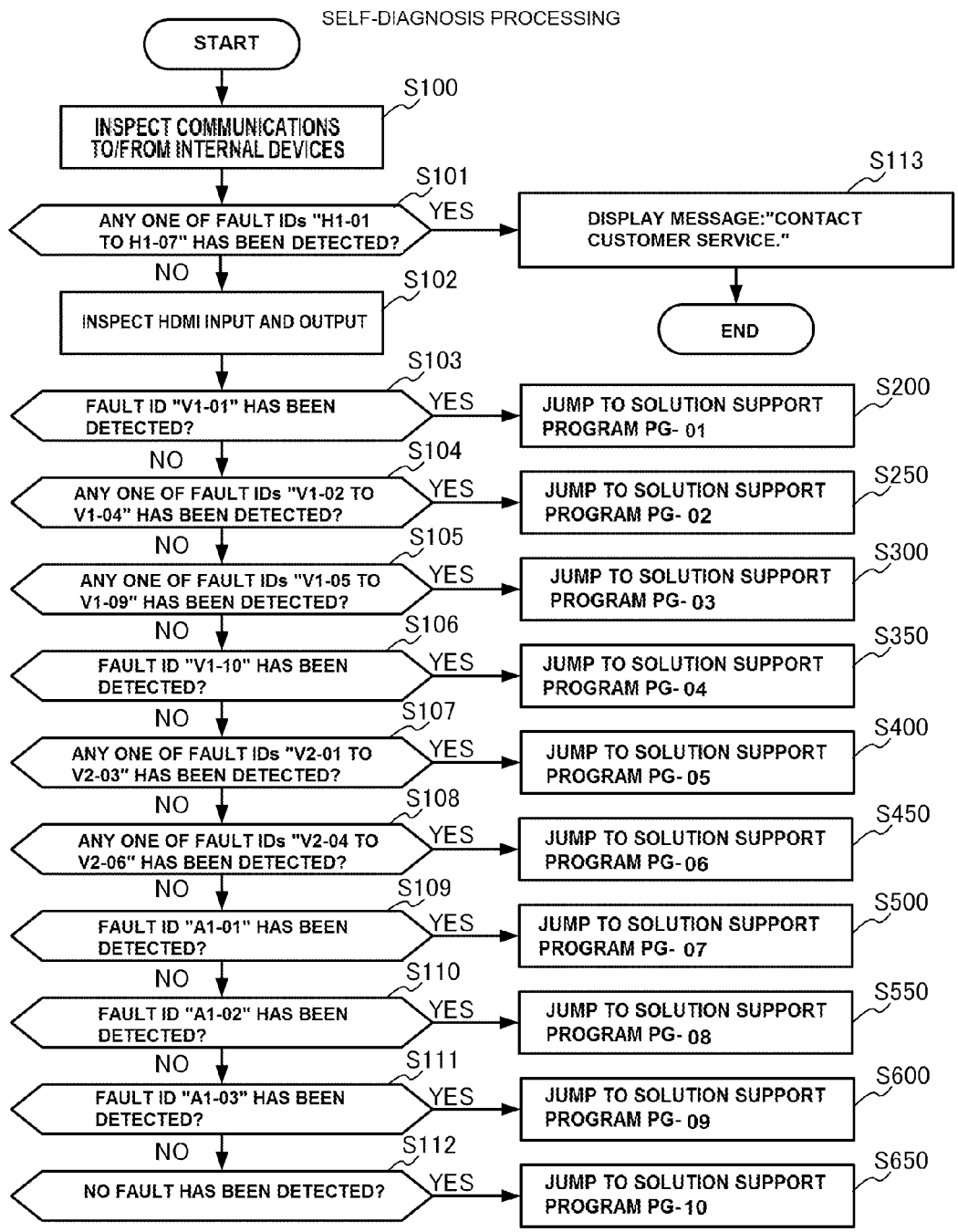
FIG. 3 is a diagram for illustrating an operation flow of self-diagnosis processing.

FIG. 3 is a diagram for illustrating an operation flow of the self-diagnosis processing.

First, the main control unit 9 inspects communications to/from internal devices that form the respective components 2 to 8 of the audio-visual device 1 (S100). Then, the main control unit 9 determines a fault corresponding to any one of fault IDs "H1-01 to H1-07" within the fault management table 70 shown in FIG. 2, that is, determines whether or not a communication error with respect to any one of the internal devices has been detected (S101). When the fault corresponding to any one of the fault IDs "H1-01 to H1-07" has been detected (YES in S101), the main control unit 9 determines that the audio-visual device 1 needs to be repaired, displays a message for prompting the user to contact a customer service on the man-machine interface unit 2 (S113), and then brings the flow to an end.

Meanwhile, when none of the faults corresponding to the fault IDs "H1-01 to H1-07" has been detected (NO in S101), the main control unit 9 inspects input from the HDMI-compatible input device connected to the HDMI input portion 30 through the HDMI cable, and inspects output to the HDMI-compatible output device connected to the HDMI output portion 40 through the HDMI cable (inspects HDMI input and output) (S102).

Then, the main control unit 9 determines a fault corresponding to a fault ID "V1-01" within the fault management table 70 shown in FIG. 2, that is, determines whether or not an error in detection of a supply voltage from the HDMI-compatible input device has been detected (S103). When the fault corresponding to the fault ID "V1-01" has been detected (YES in S103), the main control unit 9 executes a solution support program PG-01 stored in the solution support program storage unit 7 in association with the fault ID "V1-01" (S200).

Subsequently, the main control unit 9 determines a fault corresponding to any one of fault IDs "V1-02 to V1-04" within the fault management table 70 shown in FIG. 2, that is, determines whether or not any one of an unlocked phase locked loop (PLL) of transition minimized differential signaling (TMDS) included in the HDMI signal of the HDMI-compatible input device, a high-bandwidth digital content protection (HDCP) error of the HDMI-compatible input device, and a quality error of the TMDS included in the HDMI signal of the HDMI-compatible input device has been detected (S104). When the fault corresponding to any one of the fault IDs "V1-02 to V1-04" has been detected (YES in S104), the main control unit 9 executes a solution support program PG-02 stored in the solution support program storage unit 7 in association with those fault IDs "V1-02 to V1-04" (S250).

Subsequently, the main control unit 9 determines a fault corresponding to any one of fault IDs "V1-05 to V1-09" within the fault management table 70 shown in FIG. 2, that is, determines whether or not SCDT (input state of a video signal) turned off with a locked PLL of the TMDS included in the HDMI signal of the HDMI-compatible input device, a video information error (no audio video interleave (AVI) information existing in the HDMI signal of the HDMI-compatible input device) of the HDMI-compatible input device, a video timing error (inaccurate video timing) of the HDMI-compatible input device, a resolution of the digital video signal input from the HDMI-compatible input device being not supported by the HDMI-compatible output device, and a constantly on state of an AV mute included in the HDMI signal of the HDMI-compatible input device has been detected (S105). When the fault corresponding to any one of the fault IDs "V1-05 to V1-09" has been detected (YES in S105), the main control unit 9 executes a solution support program PG-03 stored in the solution support program storage unit 7 in association with those fault IDs "V1-05 to V1-09" (S300).

Subsequently, the main control unit 9 determines a fault corresponding to a fault ID "V1-10" within the fault management table 70 shown in FIG. 2, that is, determines whether or not a stream ID type error of the HDMI-compatible input device (the HDMI-compatible output device not being compatible with an HDCP version specified by a stream ID included in the HDMI signal of the HDMI-compatible input device) has been detected (S106). When the fault corresponding to the fault ID "V1-10" has been detected (YES in S106), the main control unit 9 executes a solution support program PG-04 stored in the solution support program storage unit 7 in association with the fault ID "V1-10" (S350).

Subsequently, the main control unit 9 determines a fault corresponding to any one of fault IDs "V2-01 to V2-03" within the fault management table 70 shown in FIG. 2, that is, determines whether or not any one of a hot plug detection signal (HPD) of the HDMI-compatible output device being constantly low, a voltage detection signal (Rx Sense) of the HDMI-compatible output device being constantly low, and an error in acquisition of extended display identification data (EDID) of the HDMI-compatible output device has been detected (S107). When the fault corresponding to any one of the fault IDs "V2-01 to V2-03" has been detected (YES in S107), the main control unit 9 executes a solution support program PG-05 stored in the solution support program storage unit 7 in association with those fault IDs "V2-01 to V2-03" (S400).

Subsequently, the main control unit 9 determines a fault corresponding to any one of fault IDs "V2-04 to V2-06" within the fault management table 70 shown in FIG. 2, that is, determines whether or not any one of the hot plug detection signal of the HDMI-compatible output device continuously including a warning, the voltage detection signal of the HDMI-compatible output device continuously including a warning, and an HDCP error of the HDMI-compatible output device has been detected (S108). When the fault corresponding to any one of the fault IDs "V2-04 to V2-06" has been detected (YES in S108), the main control unit 9 executes a solution support program PG-06 stored in the solution support program storage unit 7 in association with those fault IDs "V2-04 to V2-06" (S450).

Subsequently, the main control unit 9 determines a fault corresponding to a fault ID "A1-01" within the fault management table 70 shown in FIG. 2, that is, determines whether or not no audio packet being found in the HDMI signal input from the HDMI-compatible input device has been detected (S109). When the fault corresponding to the fault ID "A1-01" has been detected (YES in S109), the main control unit 9 executes a solution support program PG-07 stored in the solution support program storage unit 7 in association with the fault ID "A1-01" (S500).

Subsequently, the main control unit 9 determines a fault corresponding to a fault ID "A1-02" within the fault management table 70 shown in FIG. 2, that is, determines whether or not device information of the HDMI-compatible input device being invalid has been detected (S110). When the fault corresponding to the fault ID "A1-02" has been detected (YES in S110), the main control unit 9 executes a solution support program PG-08 stored in the solution support program storage unit 7 in association with the fault ID "A1-02" (S550).

Subsequently, the main control unit 9 determines a fault corresponding to a fault ID "A1-03" within the fault management table 70 shown in FIG. 2, that is, determines whether or not a mismatch in information between the HDMI-compatible input device and the audio signal processing unit 6 has been detected (S111). When the fault corresponding to the fault ID "A1-03" has been detected (YES in S111), the main control unit 9 executes a solution support program PG-09 stored in the solution support program storage unit 7 in association with the fault ID "A1-03" (S600).

Finally, when none of the faults registered in the fault management table 70 shown in FIG. 2 has been detected (YES in S112), the main control unit 9 executes a solution support program PG-10 stored in the solution support program storage unit 7 (S650).

Figure 4:
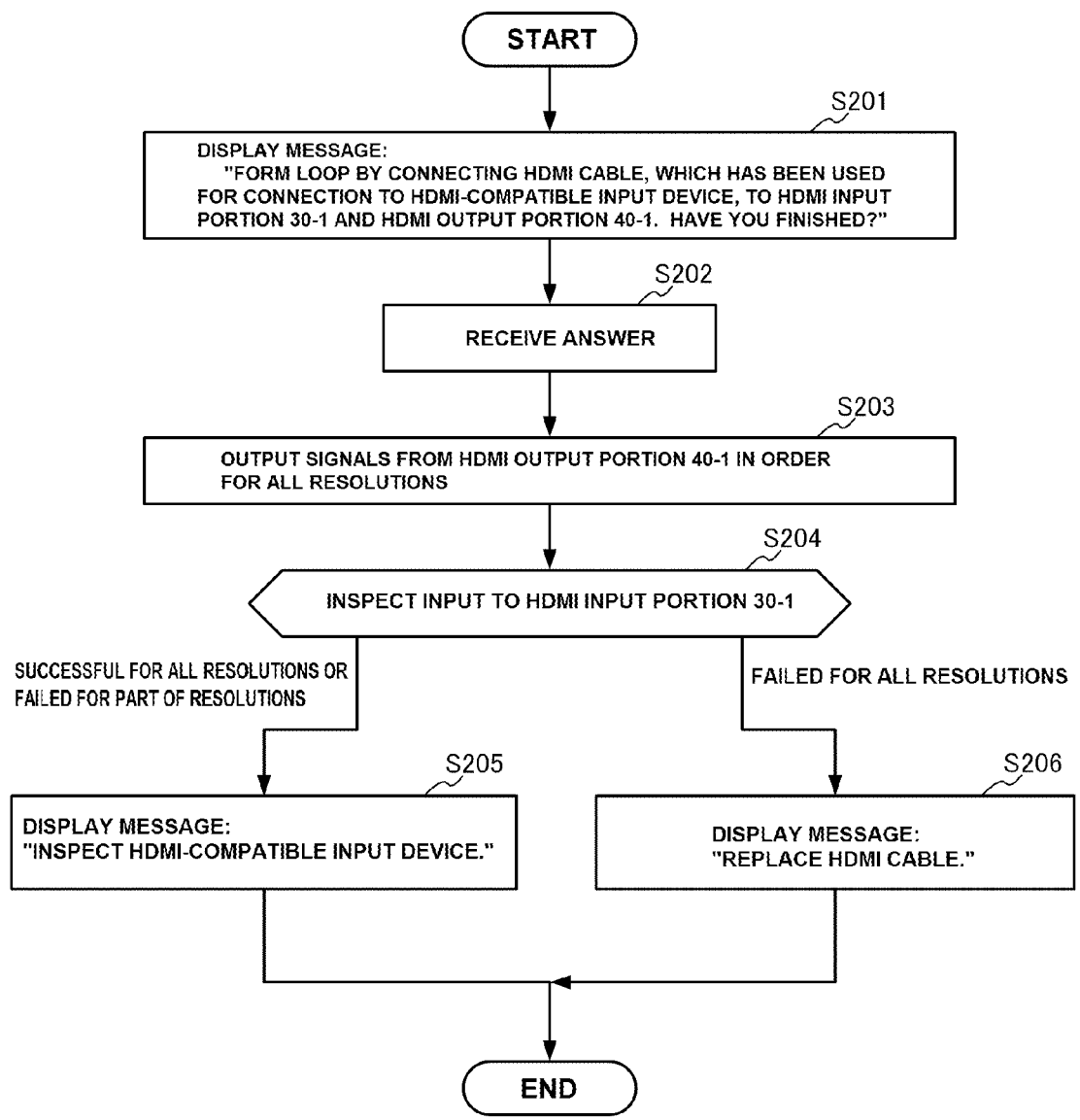
FIG. 4 is a diagram for illustrating an operation flow achieved when a solution support program PG-01 is executed by a main control unit 9 (S200 of FIG. 3).

FIG. 4 is a diagram for illustrating an operation flow achieved when the solution support program PG-01 is executed by the main control unit 9 (S200 of FIG. 3).

First, the main control unit 9 displays, on the man-machine interface unit 2, a message for prompting the user to form a loop by connecting the HDMI cable, which has been used for connection to the HDMI-compatible input device, to a predetermined HDMI input portion 30 and a predetermined HDMI output portion 40 (in this case, HDMI input portion 30-1 and HDMI output portion 40-1) (S201).

After that, the main control unit 9 receives an answer indicating completion of the loop formation from the user through the man-machine interface unit 2 (S202), and outputs the HDMI signal including the digital video signal from the HDMI output portion 40 connected to the HDMI cable in order for each of digital video signals of all resolutions (specifically, resolutions of 1080p, 4K (3G), and 4K (6G)) supported by the audio-visual device 1 (S203). Then, the main control unit 9 inspects whether or not the digital video signal included in the HDMI signal has been successfully received by the HDMI input portion 30 connected to the HDMI cable (S204).

Subsequently, when the digital video signals of all the resolutions supported by the audio-visual device 1 have been received correctly, or when only the digital video signals of a part of the resolutions have not been received correctly ("successful for all resolutions or failed for part of resolutions" in S204), the main control unit 9 determines that the cause of the fault resides in the HDMI-compatible input device, displays a message for prompting the user to inspect the HDMI-compatible input device on the man-machine interface unit 2 (S205), and then brings the flow to an end.

Meanwhile, when none of the digital video signals of all the resolutions supported by the audio-visual device 1 has been received correctly ("failed for all resolutions" in S204), the main control unit 9 determines that the cause of the fault resides in the HDMI cable used to form the loop, displays a message for prompting the user to replace the HDMI cable on the man-machine interface unit 2 (S206), and then brings the flow to an end.

Figure 5:
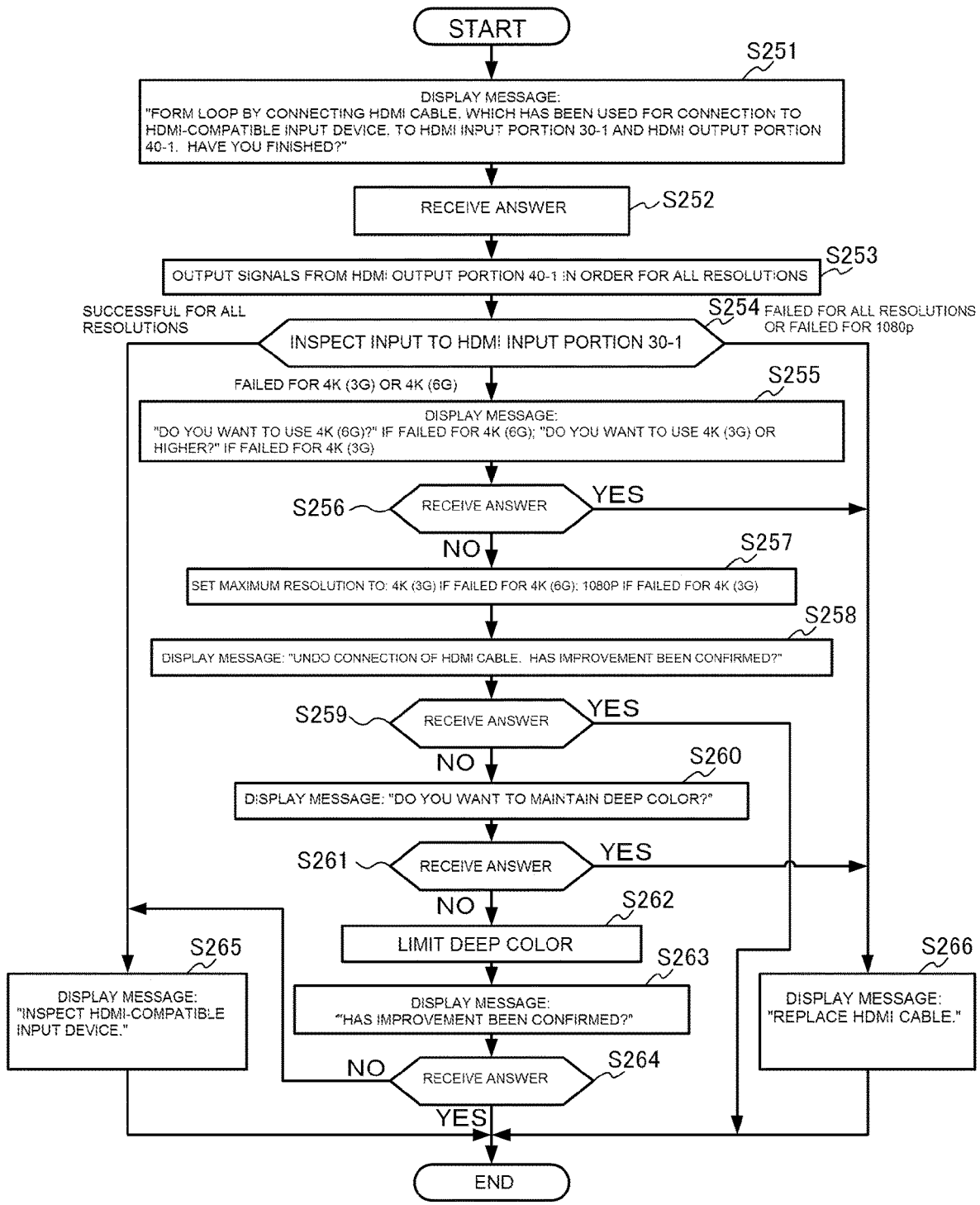
FIG. 5 is a diagram for illustrating an operation flow achieved when a solution support program PG-02 is executed by the main control unit 9 (S250 of FIG. 3).

FIG. 5 is a diagram for illustrating an operation flow achieved when the solution support program PG-02 is executed by the main control unit 9 (S250 of FIG. 3).

First, the main control unit 9 displays, on the man-machine interface unit 2, the message for prompting the user to form the loop by connecting the HDMI cable, which has been used for connection to the HDMI-compatible input device, to the predetermined HDMI input portion 30 and the predetermined HDMI output portion 40 (in this case, HDMI input portion 30-1 and HDMI output portion 40-1) (S251).

After that, the main control unit 9 receives the answer indicating completion of the loop formation from the user through the man-machine interface unit 2 (S252), and outputs the HDMI signal including the digital video signal from the HDMI output portion 40 connected to the HDMI cable in order for each of digital video signals of all resolutions (specifically, resolutions of 1080p, 4K (3G), and 4K (6G)) supported by the audio-visual device 1 (S253). Then, the main control unit 9 inspects whether or not the digital video signal included in the HDMI signal has been successfully received by the HDMI input portion 30 connected to the HDMI cable (S254).

Subsequently, when the digital video signals of all the resolutions supported by the audio-visual device 1 have been received correctly ("successful for all resolutions" in S254), the main control unit 9 determines that the cause of the fault resides in the HDMI-compatible input device, displays the message for prompting the user to inspect the HDMI-compatible input device on the man-machine interface unit 2 (S265), and then brings the flow to an end.

When none of the digital video signals of all the resolutions supported by the audio-visual device 1 has been received correctly, or when the digital video signal of the resolution of 1080p has not been received correctly ("failed for all resolutions or failed for 1080p" in S254), the main control unit 9 determines that the cause of the fault resides in the HDMI cable used to form the loop, displays the message for prompting the user to replace the HDMI cable on the man-machine interface unit 2 (S266), and then brings the flow to an end.

When the digital video signal of the resolution of 4K (3G) or 4K (6G) among the digital video signals of all the resolutions supported by the audio-visual device 1 has not been received correctly ("failed for 4K (3G) or 4K (6G)" in S254), the main control unit 9 displays a message for inquiring the user whether or not to use a resolution equal to or higher than the resolution of the digital video signal that has not been received correctly (4K (6G) if failed for 4K (6G), and 4K (3G) or higher if failed for 4K (3G)) on the man-machine interface unit 2 (S255).

After that, the main control unit 9 receives an answer from the user through the man-machine interface unit 2 (S256). When the received answer is an answer for agreeing to use the resolution equal to or higher than the resolution of the digital video signal that has not been received correctly (YES in S256), the main control unit 9 determines that the HDMI cable used to form the loop needs to be replaced, displays the message for prompting the user to replace the HDMI cable on the man-machine interface unit 2 (S266), and then brings the flow to an end.

Meanwhile, when the received answer is an answer that the user is not to use the resolution equal to or higher than the resolution of the digital video signal that has not been received correctly (NO in S256), the main control unit 9 sets a maximum resolution supported by the video signal processing unit 5 to a resolution lower than the resolution of the digital video signal that has not been received correctly (maximum resolution of 4K (3G) if failed for 4K (6G), and maximum resolution of 1080p if failed for 4K (3G)) (S257). Then, the main control unit 9 displays a message for prompting the user to undo the connection of the HDMI cable forming the loop and to confirm an improvement of the state on the man-machine interface unit 2 (S258).

After that, the main control unit 9 receives an answer from the user through the man-machine interface unit 2 (S259). When the received answer is an answer that the improvement of the state has been successfully confirmed (YES in S259), the main control unit 9 maintains a mode of limiting the maximum resolution to the resolution lower than the resolution of the digital video signal that has not been received correctly, and brings the flow to an end.

Meanwhile, when the received answer is the answer that the improvement of the state has failed to be confirmed (NO in S259), the main control unit 9 displays a message for inquiring the user whether or not to maintain a current deep color (color depth) on the man-machine interface unit 2 (S260).

After that, the main control unit 9 receives an answer from the user through the man-machine interface unit 2 (S261). When the received answer is an answer for agreeing to maintain the current deep color (YES in S261), the main control unit 9 determines that the HDMI cable used to form the loop needs to be replaced, displays the message for prompting the user to replace the HDMI cable on the man-machine interface unit 2 (S266), and then brings the flow to an end.

Meanwhile, when the received answer is an answer that the current deep color is not to be maintained (NO in S261), the main control unit 9 limits the deep color supported by the video signal processing unit 5 to a value smaller than the current value (for example, smaller than 8 bits) (S262). Then, the main control unit 9 displays the message for prompting the user to confirm the improvement of the state on the man-machine interface unit 2 (S263).

After that, the main control unit 9 receives an answer from the user through the man-machine interface unit 2 (S264). When the received answer is the answer that the improvement of the state has been successfully confirmed (YES in S264), the main control unit 9 maintains the limitation of the deep color, and brings the flow to an end.

Meanwhile, when the received answer is the answer that the improvement of the state has failed to be confirmed (NO in S264), the main control unit 9 determines that the cause of the fault resides in the HDMI-compatible input device, displays the message for prompting the user to inspect the HDMI-compatible input device on the man-machine interface unit 2 (S265), and then brings the flow to an end.

Figure 6:
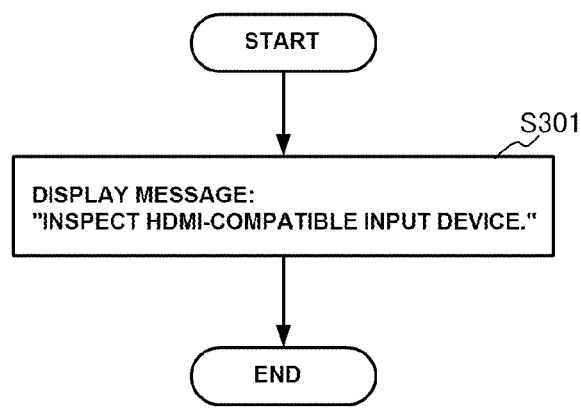
FIG. 6 is a diagram for illustrating an operation flow achieved when a solution support program PG-03 is executed by the main control unit 9 (S300 of FIG. 3).

FIG. 6 is a diagram for illustrating an operation flow achieved when the solution support program PG-03 is executed by the main control unit 9 (S300 of FIG. 3).

In this case, the main control unit 9 determines that the cause of the fault resides in the HDMI-compatible input device, displays the message for prompting the user to inspect the HDMI-compatible input device on the man-machine interface unit 2 (S301), and brings the flow to an end.

Figure 7:
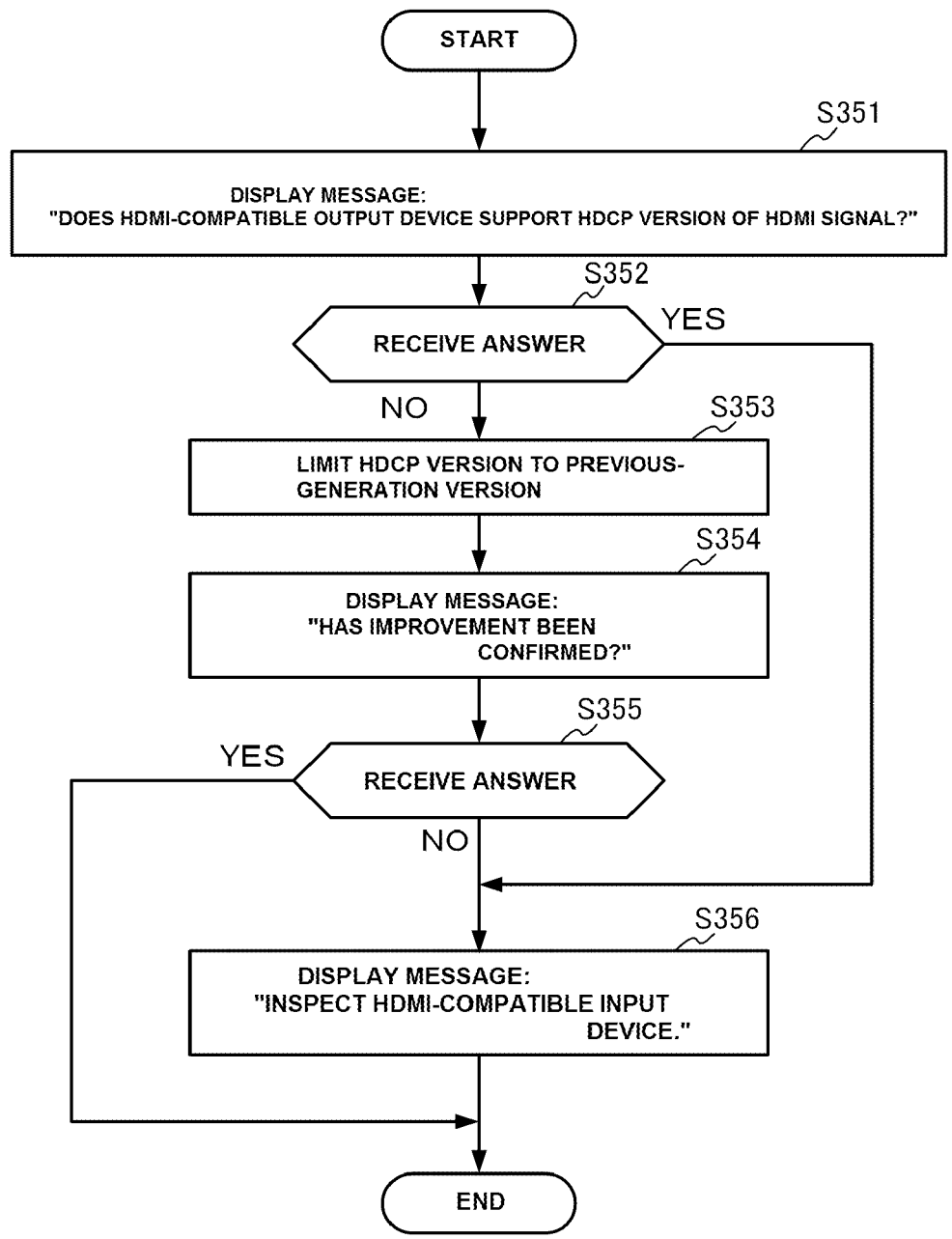
FIG. 7 is a diagram for illustrating an operation flow achieved when a solution support program PG-04 is executed by the main control unit 9 (S350 of FIG. 3).

FIG. 7 is a diagram for illustrating an operation flow achieved when the solution support program PG-04 is executed by the main control unit 9 (S350 of FIG. 3).

First, the main control unit 9 displays a message for inquiring the user whether or not the HDMI-compatible output device supports the HDCP version (specifically, ver. 2.2) specified by the stream ID included in the HDMI signal on the man-machine interface unit 2 (S351).

After that, the main control unit 9 receives an answer from the user through the man-machine interface unit 2 (S352). When the received answer is an answer that the HDMI-compatible output device supports the HDCP version specified by the stream ID included in the HDMI signal (YES in S352), the main control unit 9 determines that the cause of the fault resides in the HDMI-compatible input device, displays the message for prompting the user to inspect the HDMI-compatible input device on the man-machine interface unit 2 (S356), and then brings the flow to an end.

Meanwhile, when the received answer is an answer that the HDMI-compatible output device does not support the HDCP version specified by the stream ID included in the HDMI signal (NO in S352), the main control unit 9 limits the HDCP version supported by the video signal processing unit 5 to a previous-generation version (specifically, ver. 1.4) (S353). Then, the main control unit 9 displays the message for prompting the user to confirm the improvement of the state on the man-machine interface unit 2 (S354).

After that, the main control unit 9 receives an answer from the user through the man-machine interface unit 2 (S355). When the received answer is the answer that the improvement of the state has been successfully confirmed (YES in S355), the main control unit 9 maintains the limitation of the HDCP version, and brings the flow to an end.

Meanwhile, when the received answer is the answer that the improvement of the state has failed to be confirmed (NO in S355), the main control unit 9 determines that the cause of the fault resides in the HDMI-compatible input device, displays the message for prompting the user to inspect the HDMI-compatible input device on the man-machine interface unit 2 (S356), and then brings the flow to an end.

Figure 8:
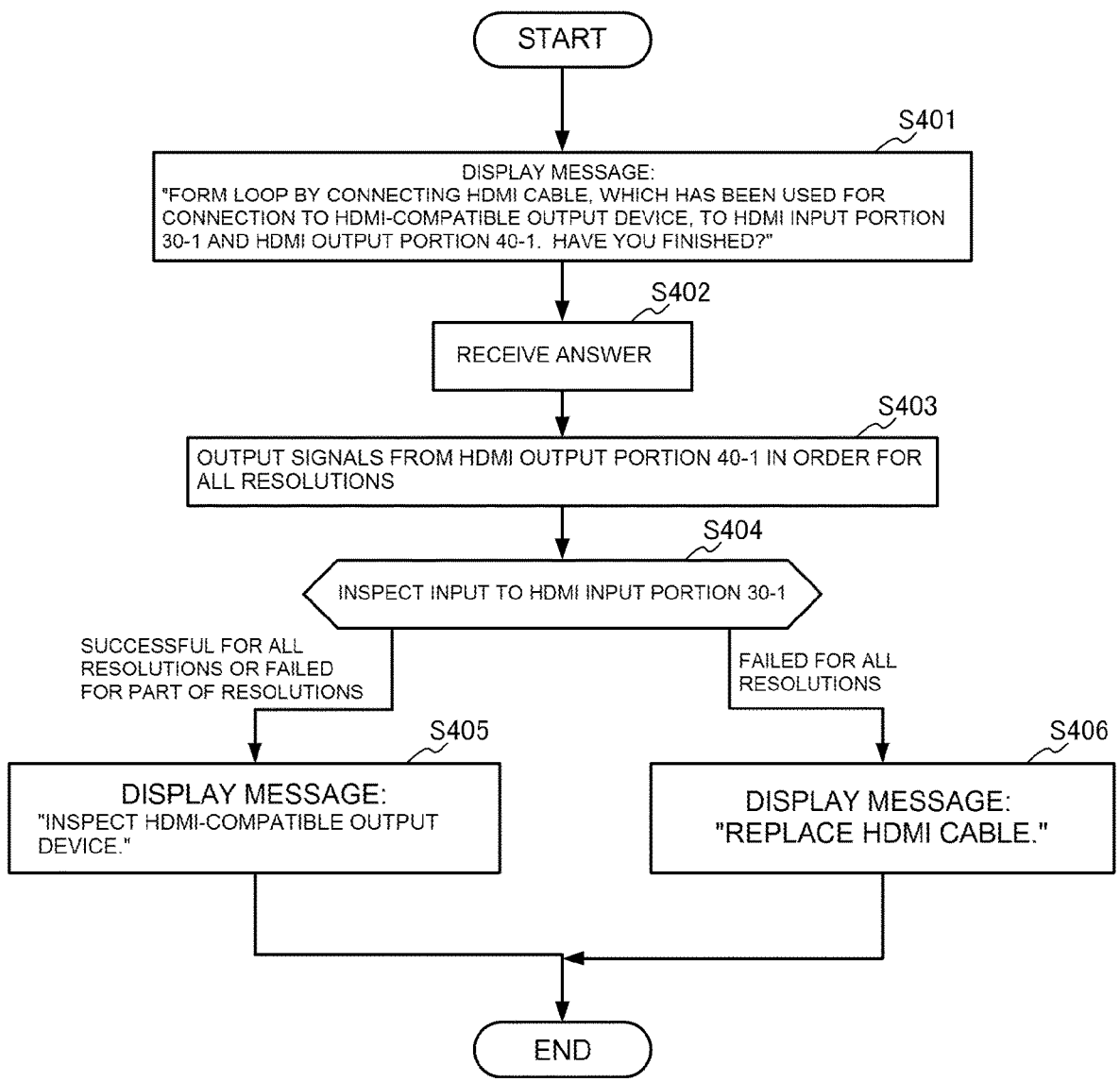
FIG. 8 is a diagram for illustrating an operation flow achieved when a solution support program PG-05 is executed by the main control unit 9 (S400 of FIG. 3).

FIG. 8 is a diagram for illustrating an operation flow achieved when the solution support program PG-05 is executed by the main control unit 9 (S400 of FIG. 3).

First, the main control unit 9 displays, on the man-machine interface unit 2, a message for prompting the user to form a loop by connecting the HDMI cable, which has been used for connection to the HDMI-compatible output device, to a predetermined HDMI input portion 30 and a predetermined HDMI output portion 40 (in this case, HDMI input portion 30-1 and HDMI output portion 40-1) (S401).

After that, the main control unit 9 receives an answer indicating completion of the loop formation from the user through the man-machine interface unit 2 (S402), and outputs the HDMI signal including the digital video signal from the HDMI output portion 40-1 connected to the HDMI cable in order for each of digital video signals of all resolutions (specifically, resolutions of 1080p, 4K (3G), and 4K (6G)) supported by the audio-visual device 1 (S403). Then, the main control unit 9 inspects whether or not the digital video signal included in the HDMI signal has been successfully received by the HDMI input portion 30-1 connected to the HDMI cable (S404).

Subsequently, when the digital video signals of all the resolutions supported by the audio-visual device 1 have been received correctly, or when only the digital video signals of a part of the resolutions have not been received correctly ("successful for all resolutions or failed for part of resolutions" in S404), the main control unit 9 determines that the cause of the fault resides in the HDMI-compatible output device, displays a message for prompting the user to inspect the HDMI-compatible output device on the man-machine interface unit 2 (S405), and then brings the flow to an end.

Meanwhile, when none of the digital video signals of all the resolutions supported by the audio-visual device 1 has been received correctly ("failed for all resolutions" in S404), the main control unit 9 determines that the cause of the fault resides in the HDMI cable used to form the loop, displays the message for prompting the user to replace the HDMI cable on the man-machine interface unit 2 (S406), and then brings the flow to an end.

Figure 9:
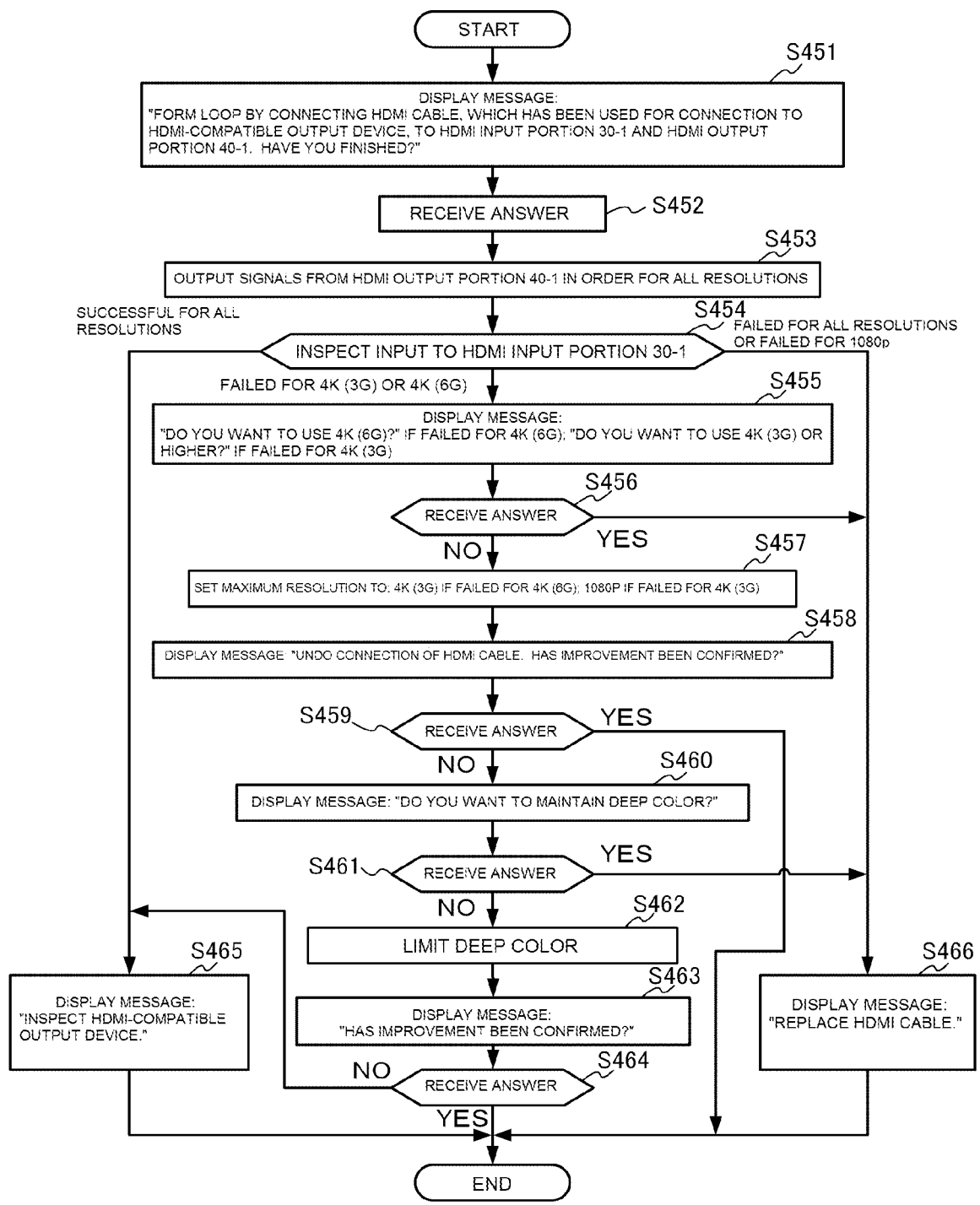
FIG. 9 is a diagram for illustrating an operation flow achieved when a solution support program PG-06 is executed by the main control unit 9 (S450 of FIG. 3).

FIG. 9 is a diagram for illustrating an operation flow achieved when the solution support program PG-06 is executed by the main control unit 9 (S450 of FIG. 3).

First, the main control unit 9 displays, on the man-machine interface unit 2, the message for prompting the user to form the loop by connecting the HDMI cable, which has been used for connection to the HDMI-compatible output device, to the predetermined HDMI input portion 30 and the predetermined HDMI output portion 40 (in this case, HDMI input portion 30-1 and HDMI output portion 40-1) (S451).

After that, the main control unit 9 receives the answer indicating completion of the loop formation from the user through the man-machine interface unit 2 (S452), and outputs the HDMI signal including the digital video signal from the HDMI output portion 40-1 connected to the HDMI cable in order for each of digital video signals of all resolutions (specifically, resolutions of 1080p, 4K (3G), and 4K (6G)) supported by the audio-visual device 1 (S453). Then, the main control unit 9 inspects whether or not the digital video signal included in the HDMI signal has been successfully received by the HDMI input portion 30-1 connected to the HDMI cable (S454).

Subsequently, when the digital video signals of all the resolutions supported by the audio-visual device 1 have been received correctly ("successful for all resolutions" in S454), the main control unit 9 determines that the cause of the fault resides in the HDMI-compatible output device, displays the message for prompting the user to inspect the HDMI-compatible output device on the man-machine interface unit 2 (S465), and then brings the flow to an end.

When none of the digital video signals of all the resolutions supported by the audio-visual device 1 has been received correctly, or when the digital video signal of the resolution of 1080p has not been received correctly ("failed for all resolutions or failed for 1080p" in S454), the main control unit 9 determines that the cause of the fault resides in the HDMI cable used to form the loop, displays the message for prompting the user to replace the HDMI cable on the man-machine interface unit 2 (S466), and then brings the flow to an end.

When the digital video signal of the resolution of 4K (3G) or 4K (6G) among the digital video signals of all the resolutions supported by the audio-visual device 1 has not been received correctly ("failed for 4K (3G) or 4K (6G)" in S454), the main control unit 9 displays the message for inquiring the user whether or not to use a resolution equal to or higher than the resolution of the digital video signal that has not been received correctly (4K (6G) if failed for 4K (6G), and 4K (3G) or higher if failed for 4K (3G)) on the man-machine interface unit 2 (S455).

After that, the main control unit 9 receives an answer from the user through the man-machine interface unit 2 (S456). When the received answer is the answer for agreeing to use the resolution equal to or higher than the resolution of the digital video signal that has not been received correctly (YES in S456), the main control unit 9 determines that the HDMI cable used to form the loop needs to be replaced, displays the message for prompting the user to replace the HDMI cable on the man-machine interface unit 2 (S466), and then brings the flow to an end.

Meanwhile, when the received answer is the answer that the user is not to use the resolution equal to or higher than the resolution of the digital video signal that has not been received correctly (NO in S456), the main control unit 9 sets the maximum resolution supported by the video signal processing unit 5 to a resolution lower than the resolution of the digital video signal that has not been received correctly (maximum resolution of 4K (3G) if failed for 4K (6G), and maximum resolution of 1080p if failed for 4K (3G)) (S457). Then, the main control unit 9 displays the message for prompting the user to undo the connection of the HDMI cable forming the loop and to confirm the improvement of the state on the man-machine interface unit 2 (S458).

After that, the main control unit 9 receives an answer from the user through the man-machine interface unit 2 (S459). When the received answer is the answer that the improvement of the state has been successfully confirmed (YES in S459), the main control unit 9 maintains the mode of limiting the maximum resolution to the resolution lower than the resolution of the digital video signal that has not been received correctly, and brings the flow to an end.

Meanwhile, when the received answer is the answer that the improvement of the state has failed to be confirmed (NO in S459), the main control unit 9 displays the message for inquiring the user whether or not to maintain a current deep color (color depth) on the man-machine interface unit 2 (S460).

After that, the main control unit 9 receives an answer from the user through the man-machine interface unit 2 (S461). When the received answer is the answer for agreeing to maintain the current deep color (YES in S461), the main control unit 9 determines that the HDMI cable used to form the loop needs to be replaced, displays the message for prompting the user to replace the HDMI cable on the man-machine interface unit 2 (S466), and then brings the flow to an end.

Meanwhile, when the received answer is the answer that the current deep color is not to be maintained (NO in S461), the main control unit 9 limits the deep color supported by the video signal processing unit 5 to a value smaller than the current value (for example, smaller than 8 bits) (S462). Then, the main control unit 9 displays the message for prompting the user to confirm the improvement of the state on the man-machine interface unit 2 (S463).

After that, the main control unit 9 receives an answer from the user through the man-machine interface unit 2 (S464). When the received answer is the answer that the improvement of the state has been successfully confirmed (YES in S464), the main control unit 9 maintains the limitation of the deep color, and brings the flow to an end.

Meanwhile, when the received answer is the answer that the improvement of the state has failed to be confirmed (NO in S464), the main control unit 9 determines that the cause of the fault resides in the HDMI-compatible output device, displays the message for prompting the user to inspect the HDMI-compatible output device on the man-machine interface unit 2 (S465), and then brings the flow to an end.

Figure 10:
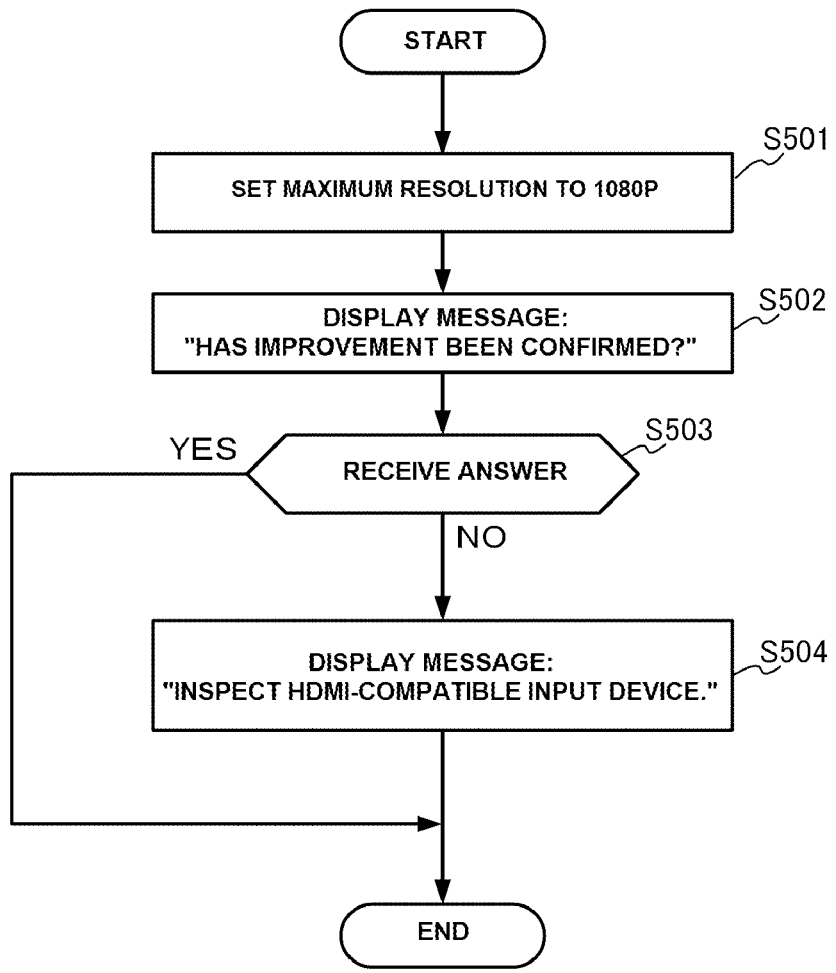
FIG. 10 is a diagram for illustrating an operation flow achieved when a solution support program PG-07 is executed by the main control unit 9 (S500 of FIG. 3).

FIG. 10 is a diagram for illustrating an operation flow achieved when the solution support program PG-07 is executed by the main control unit 9 (S500 of FIG. 3).

First, the main control unit 9 sets the maximum resolution supported by the video signal processing unit 5 to the lowest resolution (specifically, 1080p) (S501). Then, the main control unit 9 displays the message for prompting the user to confirm the improvement of the state on the man-machine interface unit 2 (S502).

After that, the main control unit 9 receives an answer from the user through the man-machine interface unit 2 (S503). When the received answer is the answer that the improvement of the state has been successfully confirmed (YES in S503), the main control unit 9 maintains the limitation of the resolution, and brings the flow to an end.

Meanwhile, when the received answer is the answer that the improvement of the state has failed to be confirmed (NO in S503), the main control unit 9 determines that the cause of the fault resides in the HDMI-compatible input device, displays the message for prompting the user to inspect the HDMI-compatible input device on the man-machine interface unit 2 (S504), and then brings the flow to an end.

Figure 11:
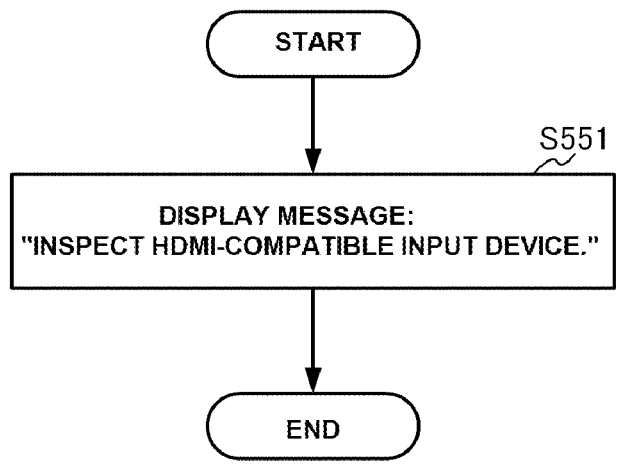
FIG. 11 is a diagram for illustrating an operation flow achieved when a solution support program PG-08 is executed by the main control unit 9 (S550 of FIG. 3).

FIG. 11 is a diagram for illustrating an operation flow achieved when the solution support program PG-08 is executed by the main control unit 9 (S550 of FIG. 3).

The main control unit 9 determines that the cause of the fault resides in the HDMI-compatible input device, displays the message for prompting the user to inspect the HDMI-compatible input device on the man-machine interface unit 2 (S551), and brings the flow to an end.

Figure 12:
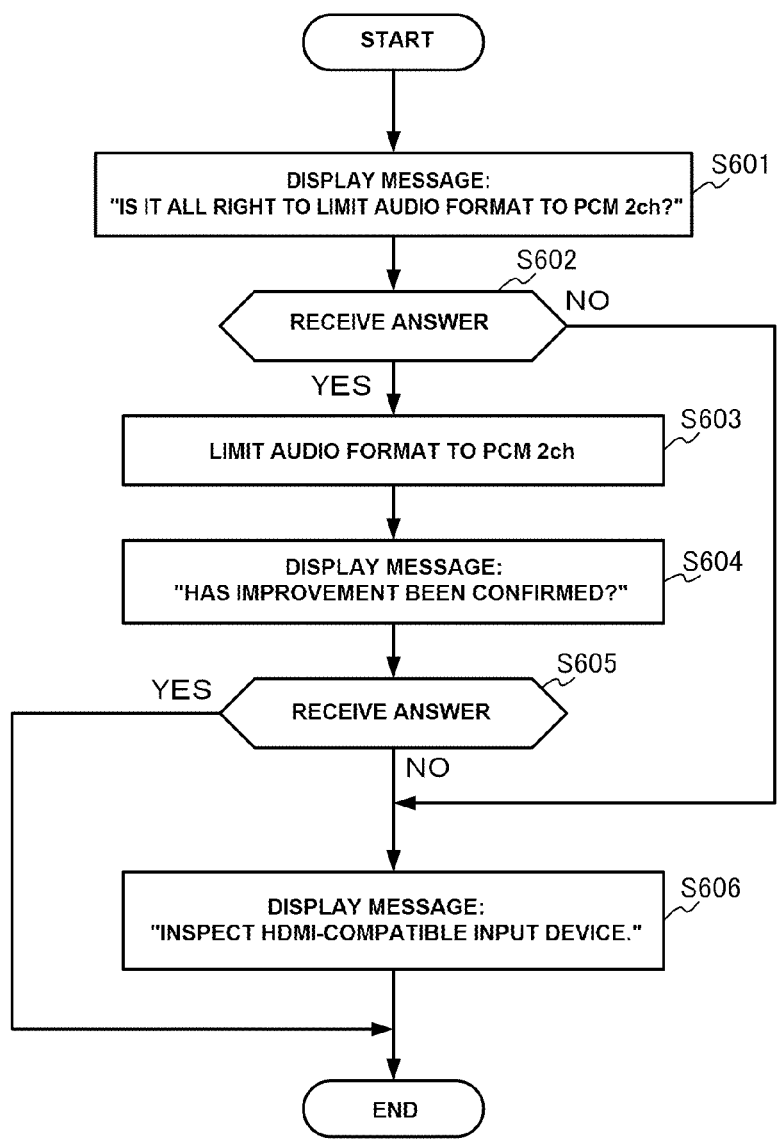
FIG. 12 is a diagram for illustrating an operation flow achieved when a solution support program PG-09 is executed by the main control unit 9 (S600 of FIG. 3).

FIG. 12 is a diagram for illustrating an operation flow achieved when the solution support program PG-09 is executed by the main control unit 9 (S600 of FIG. 3).

First, the main control unit 9 displays a message for inquiring the user whether or not to limit a format of the digital audio signal to 2 channels of pulse code modulation (PCM) on the man-machine interface unit 2 (S601).

After that, the main control unit 9 receives an answer from the user through the man-machine interface unit 2 (S602). When the received answer is an answer that the format of the digital audio signal is not to be limited to 2 channels of PCM (NO in S602), the main control unit 9 displays the message for prompting the user to inspect the HDMI-compatible input device assumed to be the cause of the fault on the man-machine interface unit 2 (S606), and then brings the flow to an end.

Meanwhile, when the received answer is an answer that the format of the digital audio signal is to be limited to 2 channels of PCM (YES in S602), the main control unit 9 limits the format of the digital audio signal supported by the audio signal processing unit 6 to 2 channels of PCM (S603). Then, the main control unit 9 displays the message for prompting the user to confirm the improvement of the state on the man-machine interface unit 2 (S604).

After that, the main control unit 9 receives an answer from the user through the man-machine interface unit 2 (S605). When the received answer is the answer that the improvement of the state has been successfully confirmed (YES in S605), the main control unit 9 maintains the limitation of the format of the digital audio signal, and brings the flow to an end.

Meanwhile, when the received answer is the answer that the improvement of the state has failed to be confirmed (NO in S605), the main control unit 9 displays the message for prompting the user to inspect the HDMI-compatible input device assumed to be the cause of the fault on the man-machine interface unit 2 (S606), and then brings the flow to an end.

Figure 13:
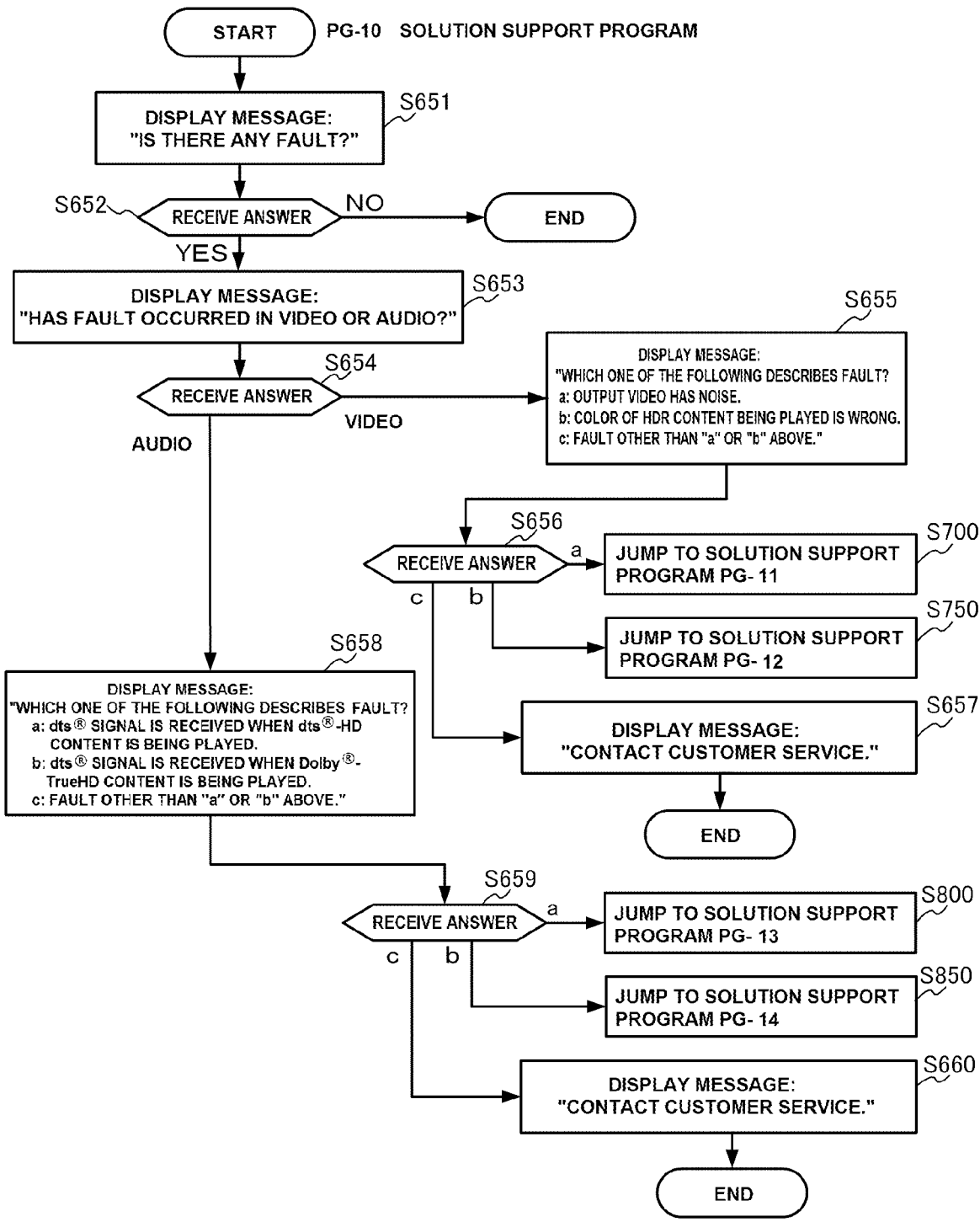
FIG. 13 is a diagram for illustrating an operation flow achieved when a solution support program PG-10 is executed by the main control unit 9 (S650 of FIG. 3).

FIG. 13 is a diagram for illustrating an operation flow achieved when the solution support program PG-10 is executed by the main control unit 9 (S650 of FIG. 3).

First, the main control unit 9 displays a message for inquiring the user whether or not any fault has occurred on the man-machine interface unit 2 (S651).

After that, the main control unit 9 receives an answer from the user through the man-machine interface unit 2 (S652). When the received answer is an answer that no fault has occurred (NO in S652), the main control unit 9 brings the flow to an end, and when the received answer is an answer that a fault has occurred (YES in S652), displays a message for inquiring the user which one of a video and an audio the fault has occurred in on the man-machine interface unit 2 (S653).

Subsequently, the main control unit 9 receives an answer from the user through the man-machine interface unit 2 (S654). When the received answer is an answer that the fault has occurred in the video ("video" in S654), the main control unit 9 displays, on the man-machine interface unit 2, a message for inquiring the user which one of "a: output video has noise.", "b: color of high dynamic range (HDR) content being played is wrong.", and "c: fault other than a orb above" the content of the fault is (S655).

After that, the main control unit 9 receives an answer from the user through the man-machine interface unit 2 (S656). When the received answer is "a: output video has noise." ("a" in S656), the main control unit 9 executes a solution support program PG-11 stored in the solution support program storage unit 7 in association with the fault detail "a: output video has noise." (S700).

When the received answer is "b: color of HDR content being played is wrong." ("b" in S656), the main control unit 9 executes a solution support program PG-12 stored in the solution support program storage unit 7 in association with the fault detail "b: color of HDR content being played is wrong." (S750).

When the received answer is "c: fault other than a orb above" ("c" in S656), the main control unit 9 determines that the audio-visual device 1 needs to be repaired, displays the message for prompting the user to contact the customer service on the man-machine interface unit 2 (S657), and then brings the flow to an end.

Meanwhile, when the received answer is an answer that the fault has occurred in the audio ("audio" in S654), the main control unit 9 displays, on the man-machine interface unit 2, a message for inquiring the user which one of "a: dts (registered trademark) signal is received from HDMI-compatible input device when dts (registered trademark)-HD content is being played.", "b: dts (registered trademark) signal is received from HDMI-compatible input device when Dolby (registered trademark)-TrueHD content is being played.", and "c: fault other than a or b above" the content of the fault is (S658).

After that, the main control unit 9 receives an answer from the user through the man-machine interface unit 2 (S659). When the received answer is "a: dts (registered trademark) signal is received from HDMI-compatible input device when dts (registered trademark)-HD content is being played." ("a" in S659), the main control unit 9 executes a solution support program PG-13 stored in the solution support program storage unit 7 in association with the fault detail "a: dts (registered trademark) signal is received from HDMI-compatible input device when dts (registered trademark)-HD content is being played." (S800).

When the received answer is "b: dts (registered trademark) signal is received from HDMI-compatible input device when Dolby (registered trademark)-TrueHD content is being played." ("b" in S659), the main control unit 9 executes a solution support program PG-14 stored in the solution support program storage unit 7 in association with the fault detail "b: dts (registered trademark) signal is received from HDMI-compatible input device when Dolby (registered trademark)-TrueHD content is being played." (S850).

When the received answer is "c: fault other than a orb above" ("c" in S659), the main control unit 9 determines that the audio-visual device 1 needs to be repaired, displays the message for prompting the user to contact the customer service on the man-machine interface unit 2 (S660), and then brings the flow to an end.

Figure 14:
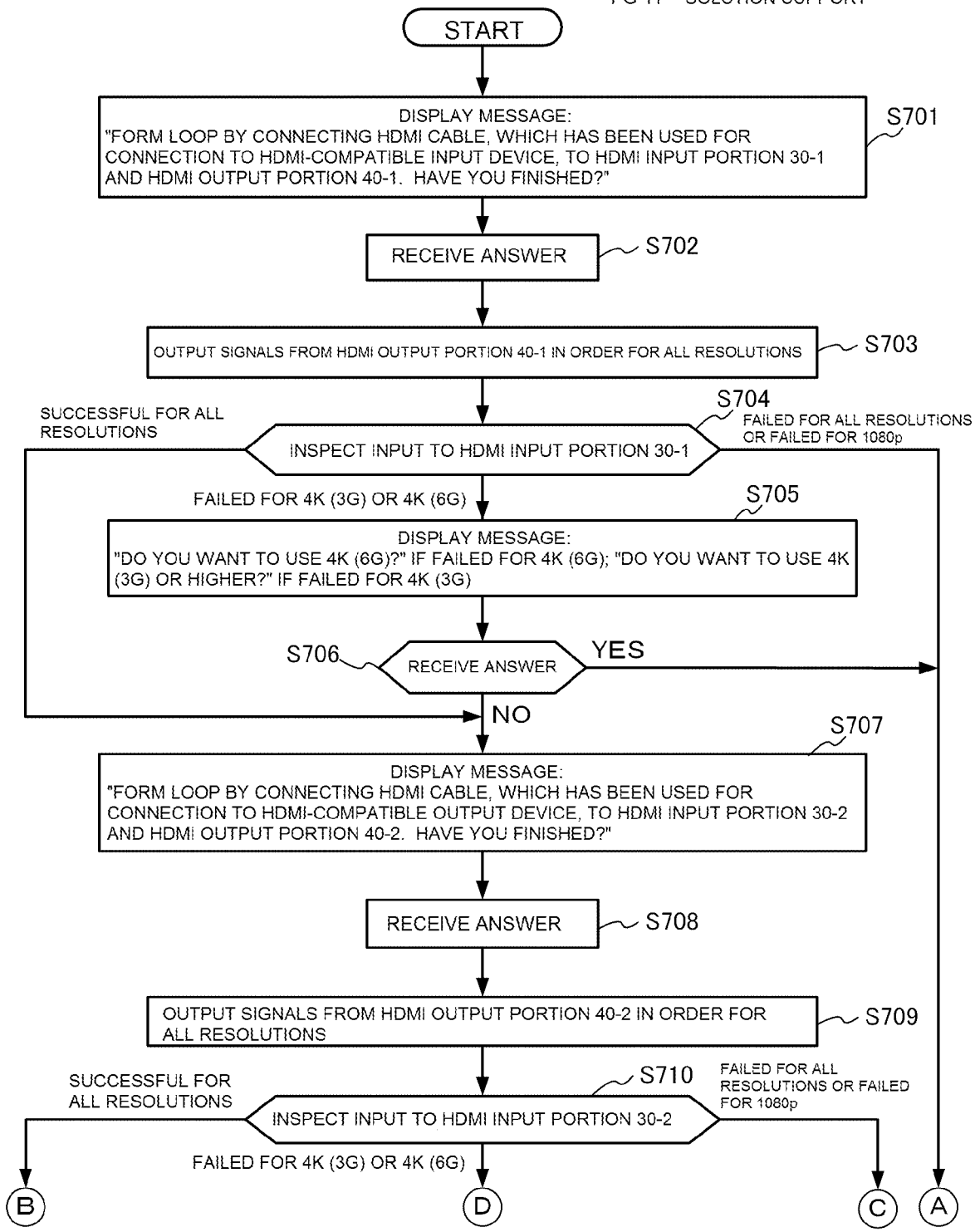
FIG. 14 is a diagram for illustrating an operation flow achieved when a solution support program PG-11 is executed by the main control unit 9 (S700 of FIG. 13).
Figure 15:
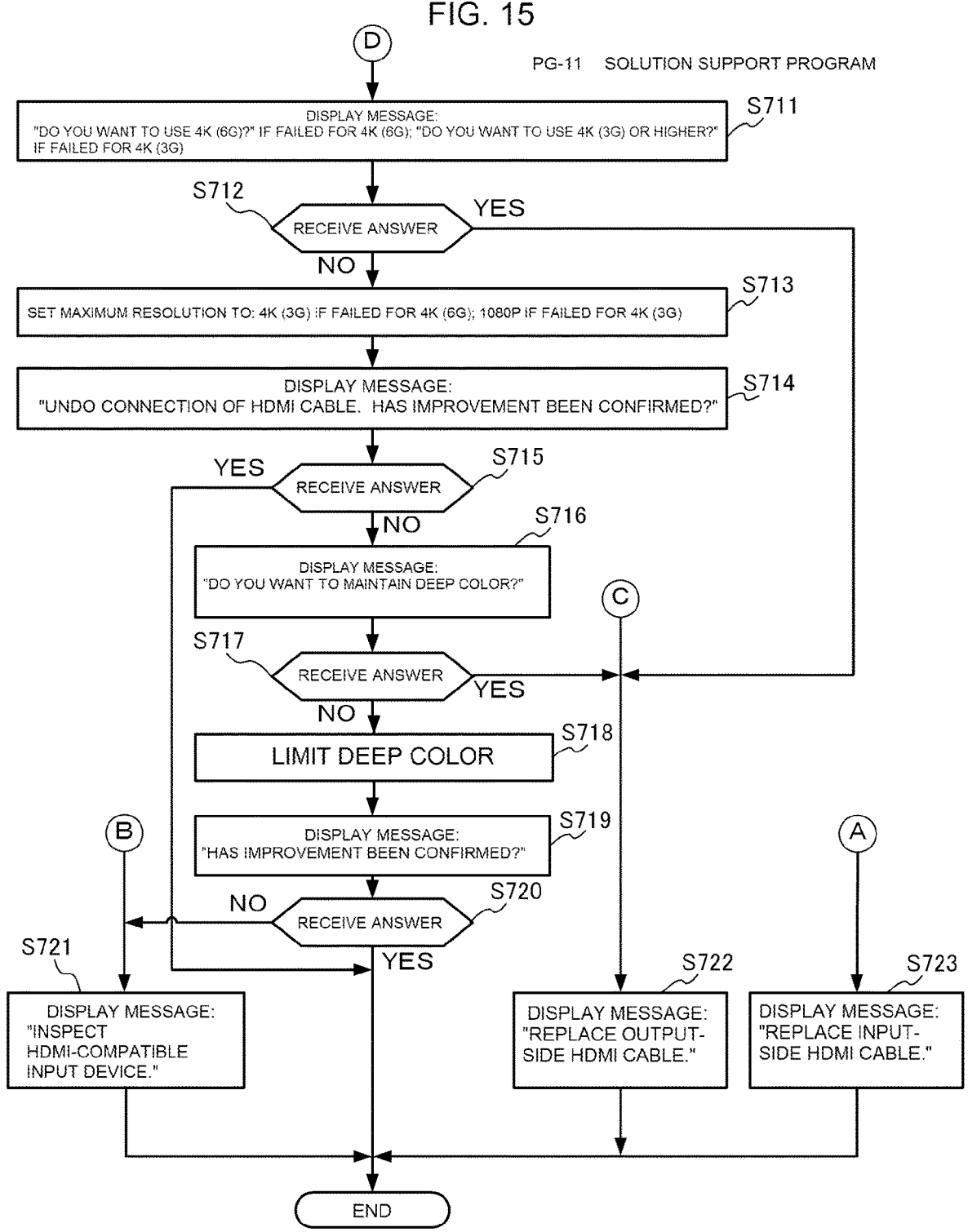
FIG. 15 is a diagram for illustrating an operation flow (continued from FIG. 14) achieved when the solution support program PG-11 is executed by the main control unit 9 (S700 of FIG. 13).

FIG. 14 and FIG. 15 are diagrams for illustrating an operation flow achieved when the solution support program PG-11 is executed by the main control unit 9 (S700 of FIG. 13).

First, the main control unit 9 displays, on the man-machine interface unit 2, the message for prompting the user to form the loop by connecting the HDMI cable, which has been used for connection to the HDMI-compatible input device, to the predetermined HDMI input portion 30 and the predetermined HDMI output portion 40 (in this case, HDMI input portion 30-1 and HDMI output portion 40-1) (S701).

After that, the main control unit 9 receives the answer indicating completion of the loop formation from the user through the man-machine interface unit 2 (S702), and outputs the HDMI signal including the digital video signal from the HDMI output portion 40-1 connected to the HDMI cable in order for each of digital video signals of all resolutions (specifically, resolutions of 1080p, 4K (3G), and 4K (6G)) supported by the audio-visual device 1 (S703). Then, the main control unit 9 inspects whether or not the digital video signal included in the HDMI signal has been successfully received by the HDMI input portion 30-1 connected to the HDMI cable (S704).

Subsequently, when the digital video signals of all the resolutions supported by the audio-visual device 1 have been received correctly ("successful for all resolutions" in S704), the main control unit 9 proceeds to Step S707. When none of the digital video signals of all the resolutions supported by the audio-visual device 1 has been received correctly, or when the digital video signal of the resolution of 1080p has not been received correctly ("failed for all resolutions or failed for 1080p" in S704), the main control unit 9 determines that the cause of the fault resides in the HDMI cable (HDMI cable on the input side) used to form the loop, displays the message for prompting the user to replace the HDMI cable on the man-machine interface unit 2 (S723), and then brings the flow to an end.

When the digital video signal of the resolution of 4K (3G) or 4K (6G) among the digital video signals of all the resolutions supported by the audio-visual device 1 has not been received correctly ("failed for 4K (3G) or 4K (6G)" in S704), the main control unit 9 displays the message for inquiring the user whether or not to use a resolution equal to or higher than the resolution of the digital video signal that has not been received correctly (4K (6G) if failed for 4K (6G), and 4K (3G) or higher if failed for 4K (3G)) on the man-machine interface unit 2 (S705).

After that, the main control unit 9 receives an answer from the user through the man-machine interface unit 2 (S706). When the received answer is the answer for agreeing to use the resolution equal to or higher than the resolution of the digital video signal that has not been received correctly (YES in S706), the main control unit 9 determines that the HDMI cable (HDMI cable on the input side) used to form the loop needs to be replaced, displays the message for prompting the user to replace the HDMI cable on the man-machine interface unit 2 (S723), and then brings the flow to an end. Meanwhile, when the received answer is the answer that the user is not to use the resolution equal to or higher than the resolution of the digital video signal that has not been received correctly (NO in S706), the main control unit 9 proceeds to Step S707.

Subsequently, in Step S707, the main control unit 9 displays, on the man-machine interface unit 2, the message for prompting the user to form the loop by connecting the HDMI cable, which has been used for connection to the HDMI-compatible output device, to the predetermined HDMI input portion 30 and the predetermined HDMI output portion 40 (in this case, HDMI input portion 30-2 and HDMI output portion 40-2).

After that, the main control unit 9 receives the answer indicating completion of the loop formation from the user through the man-machine interface unit 2 (S708), and outputs the HDMI signal including the digital video signal from the HDMI output portion 40-2 connected to the HDMI cable in order for each of digital video signals of all resolutions (specifically, resolutions of 1080p, 4K (3G), and 4K (6G)) supported by the audio-visual device 1 (S709). Then, the main control unit 9 inspects whether or not the digital video signal included in the HDMI signal has been successfully received by the HDMI input portion 30-2 connected to the HDMI cable (S710).

Subsequently, when the digital video signals of all the resolutions supported by the audio-visual device 1 have been received correctly ("successful for all resolutions" in S710), the main control unit 9 determines that the cause of the fault resides in the HDMI-compatible input device, displays the message for prompting the user to inspect the HDMI-compatible input device on the man-machine interface unit 2 (S721), and then brings the flow to an end.

When none of the digital video signals of all the resolutions supported by the audio-visual device 1 has been received correctly, or when the digital video signal of the resolution of 1080p has not been received correctly ("failed for all resolutions or failed for 1080p" in S710), the main control unit 9 determines that the cause of the fault resides in the HDMI cable (HDMI cable on the output side) used to form the loop, displays the message for prompting the user to replace the HDMI cable on the man-machine interface unit 2 (S722), and then brings the flow to an end.

When the digital video signal of the resolution of 4K (3G) or 4K (6G) among the digital video signals of all the resolutions supported by the audio-visual device 1 has not been received correctly ("failed for 4K (3G) or 4K (6G)" in S710), the main control unit 9 displays the message for inquiring the user whether or not to use a resolution equal to or higher than the resolution of the digital video signal that has not been received correctly (4K (6G) if failed for 4K (6G), and 4K (3G) or higher if failed for 4K (3G)) on the man-machine interface unit 2 (S711).

After that, the main control unit 9 receives an answer from the user through the man-machine interface unit 2 (S712). When the received answer is the answer for agreeing to use the resolution equal to or higher than the resolution of the digital video signal that has not been received correctly (YES in S712), the main control unit 9 determines that the HDMI cable (HDMI cable on the output side) used to form the loop needs to be replaced, displays the message for prompting the user to replace the HDMI cable on the man-machine interface unit 2 (S722), and then brings the flow to an end.

Meanwhile, when the received answer is the answer that the user is not to use the resolution equal to or higher than the resolution of the digital video signal that has not been received correctly (NO in S712), the main control unit 9 sets the maximum resolution supported by the video signal processing unit 5 to a resolution lower than the resolution of the digital video signal that has not been received correctly (maximum resolution of 4K (3G) if failed for 4K (6G), and maximum resolution of 1080p if failed for 4K (3G)) (S713). Then, the main control unit 9 displays the message for prompting the user to undo the connection of the HDMI cable forming the loop and to confirm the improvement of the state on the man-machine interface unit 2 (S714).

After that, the main control unit 9 receives an answer from the user through the man-machine interface unit 2 (S715). When the received answer is the answer that the improvement of the state has been successfully confirmed (YES in S715), the main control unit 9 maintains a mode of limiting the maximum resolution to the resolution lower than the resolution of the digital video signal that has not been received correctly, and brings the flow to an end.

Meanwhile, when the received answer is the answer that the improvement of the state has failed to be confirmed (NO in S715), the main control unit 9 displays the message for inquiring the user whether or not to maintain a current deep color (color depth) on the man-machine interface unit 2 (S716).

After that, the main control unit 9 receives an answer from the user through the man-machine interface unit 2 (S717). When the received answer is the answer for agreeing to maintain the current deep color (YES in S717), the main control unit 9 determines that the HDMI cable (HDMI cable on the output side) used to form the loop needs to be replaced, displays the message for prompting the user to replace the HDMI cable on the man-machine interface unit 2 (S722), and then brings the flow to an end.

Meanwhile, when the received answer is the answer that the current deep color is not to be maintained (NO in S717), the main control unit 9 limits the deep color supported by the video signal processing unit 5 to a value smaller than the current value (for example, smaller than 8 bits) (S718). Then, the main control unit 9 displays the message for prompting the user to confirm the improvement of the state on the man-machine interface unit 2 (S719).

After that, the main control unit 9 receives an answer from the user through the man-machine interface unit 2 (S720). When the received answer is the answer that the improvement of the state has been successfully confirmed (YES in S720), the main control unit 9 maintains the limitation of the deep color, and brings the flow to an end.

Meanwhile, when the received answer is the answer that the improvement of the state has failed to be confirmed (NO in S720), the main control unit 9 determines that the cause of the fault resides in the HDMI-compatible input device, displays the message for prompting the user to inspect the HDMI-compatible input device on the man-machine interface unit 2 (S721), and then brings the flow to an end.

Figure 16:
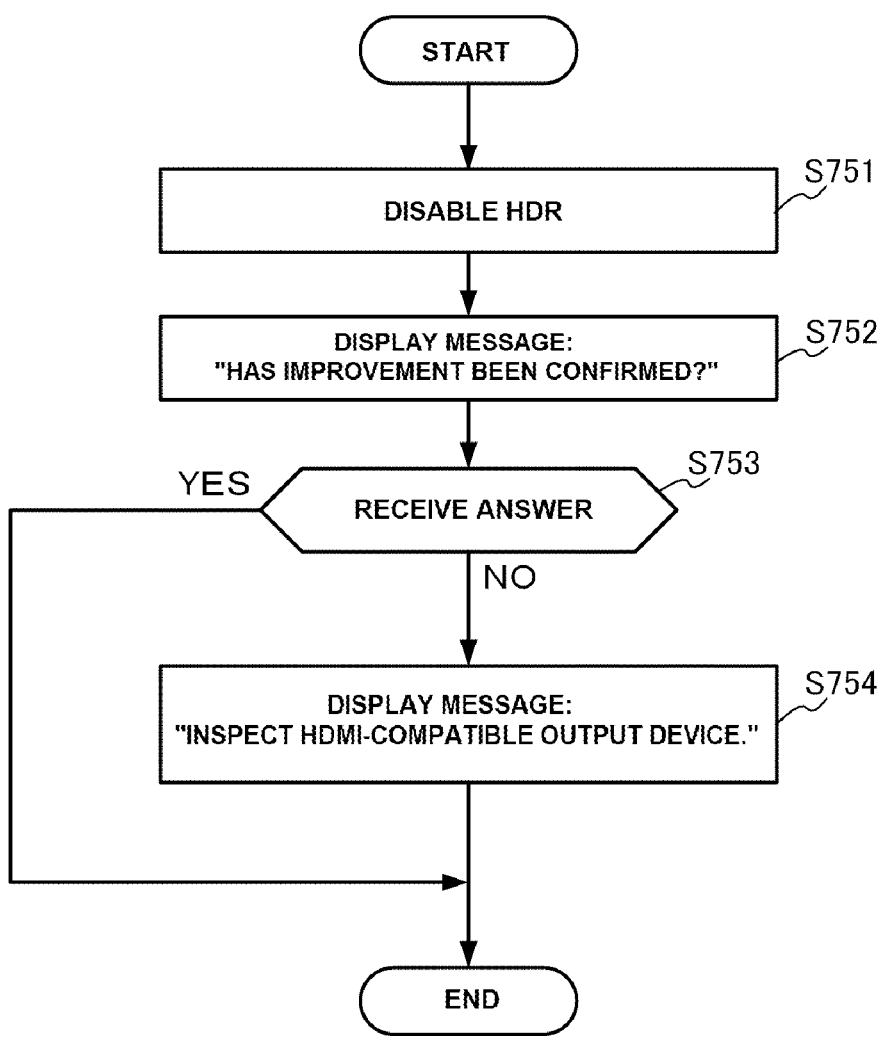
FIG. 16 is a diagram for illustrating an operation flow achieved when a solution support program PG-12 is executed by the main control unit 9 (S750 of FIG. 13).

FIG. 16 is a diagram for illustrating an operation flow achieved when the solution support program PG-12 is executed by the main control unit 9 (S750 of FIG. 13).

First, the main control unit 9 disables a support for HDR within the video signal processing unit 5 (S751). Then, the main control unit 9 displays the message for prompting the user to confirm the improvement of the state on the man-machine interface unit 2 (S752).

After that, the main control unit 9 receives an answer from the user through the man-machine interface unit 2 (S753). When the received answer is the answer that the improvement of the state has been successfully confirmed (YES in S753), the main control unit 9 maintains the disablement of HDR, and brings the flow to an end.

Meanwhile, when the received answer is the answer that the improvement of the state has failed to be confirmed (NO in S753), the main control unit 9 determines that the cause of the fault resides in the HDMI-compatible output device, displays the message for prompting the user to inspect the HDMI-compatible output device on the man-machine interface unit 2 (S754), and then brings the flow to an end.

Figure 17:
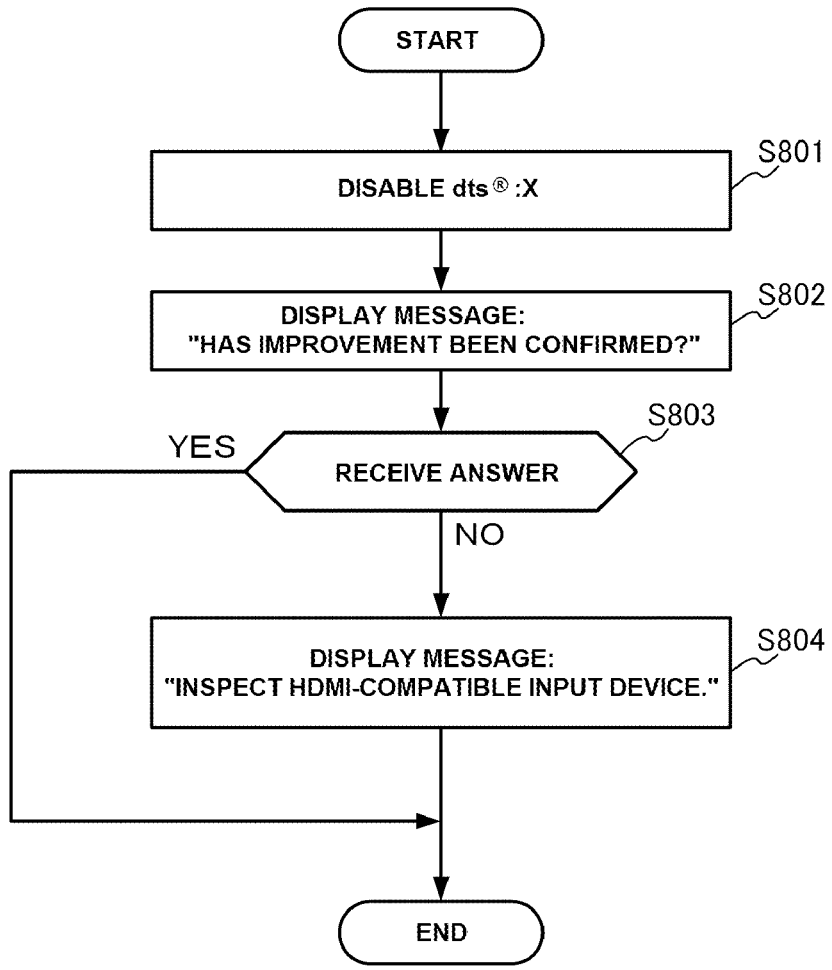
FIG. 17 is a diagram for illustrating an operation flow achieved when a solution support program PG-13 is executed by the main control unit 9 (S800 of FIG. 13).

FIG. 17 is a diagram for illustrating an operation flow achieved when the solution support program PG-13 is executed by the main control unit 9 (S800 of FIG. 13).

First, the main control unit 9 disables a support for dts (registered trademark):X (dts (registered trademark)—upgraded version of HD) within the audio signal processing unit 6 (S801). Then, the main control unit 9 displays the message for prompting the user to confirm the improvement of the state on the man-machine interface unit 2 (S802).

After that, the main control unit 9 receives an answer from the user through the man-machine interface unit 2 (S803). When the received answer is the answer that the improvement of the state has been successfully confirmed (YES in S803), the main control unit 9 maintains the disablement of dts (registered trademark):X, and brings the flow to an end.

Meanwhile, when the received answer is the answer that the improvement of the state has failed to be confirmed (NO in S803), the main control unit 9 determines that the cause of the fault resides in the HDMI-compatible input device, displays the message for prompting the user to inspect the HDMI-compatible input device on the man-machine interface unit 2 (S804), and then brings the flow to an end.

FIG. 18 is a diagram for illustrating an operation flow achieved when the solution support program PG-14 is executed by the main control unit 9 (S850 of FIG. 13).

First, the main control unit 9 disables a support for Dolby (registered trademark) Atmos (upgraded version of Dolby (registered trademark)-TrueHD) within the audio signal processing unit 6 (S851). Then, the main control unit 9 displays the message for prompting the user to confirm the improvement of the state on the man-machine interface unit 2 (S852).

After that, the main control unit 9 receives an answer from the user through the man-machine interface unit 2 (S853). When the received answer is the answer that the improvement of the state has been successfully confirmed (YES in S853), the main control unit 9 maintains the disablement of Dolby (registered trademark) Atmos, and brings the flow to an end.

Meanwhile, when the received answer is the answer that the improvement of the state has failed to be confirmed (NO in S853), the main control unit 9 determines that the cause of the fault resides in the HDMI-compatible input device, displays the message for prompting the user to inspect the HDMI-compatible input device on the man-machine interface unit 2 (S854), and then brings the flow to an end.

The one embodiment of the present invention has been described above.

In this embodiment, each potential fault is provided in advance with the solution support programs PG-01 to PG-10 for supporting the user's job for solving the fault. In this case, at least one of the solution support programs for a fault having a plurality of possible causes includes processing for displaying a message for prompting the user to conduct a predetermined job, processing for displaying a question for the user, processing for receiving the user's answer to the question, and processing for displaying a message indicating a solution corresponding to the received answer. For example, the solution support program PG-02 for the fault having a cause assumed to reside in the HDMI-compatible input device or the HDMI cable used for connection to the HDMI-compatible input device and the solution support program PG-06 for the fault having a cause assumed to reside in the HDMI-compatible output device or the HDMI cable used for connection to the HDMI-compatible output device each include processing for displaying the message for prompting the user to form a loop using the HDMI cable, processing for displaying a question relating to an improvement of the fault and receiving the user's answer to the question, and processing for displaying a message indicating the solution corresponding to the answer and including the inspection of the HDMI-compatible output device and the replacement of the HDMI cable.

Then, the fault is determined based on the information acquired through the audio-visual signal input interface unit 3 and the audio-visual signal output interface unit 4, and the solution support program for handling the determined fault is executed.

Thus, the solution to the fault having a plurality of possible causes is determined through the dialogue with the user, and hence a more appropriate solution is more likely to be found. Therefore, according to the present invention, solution of a fault that has occurred in a system including an audio-visual device can be supported more appropriately. In this embodiment, the dialogue with the user is conducted by displaying a message on a display of a man-machine interface, but may be conducted by outputting sound of the message from a speaker of the man-machine interface and inputting voice to a microphone of the man-machine interface.

Further, in this embodiment, the log data on the self-diagnosis processing is stored in the log data recording unit 8, and hence even in a case of suggesting contacting the customer service after failing to suggest any solution, the customer service is provided with the log data on the self-diagnosis processing, to thereby increase the possibility that an appropriate solution may be suggested by the customer service.

The present invention is not limited to the above-mentioned embodiment, and various modifications can be made thereto without departing from the spirit of the present invention.

For example, in this embodiment, the functional components of the audio-visual device 1 illustrated in FIG. 1 may be implemented in a hardware manner by an integrated logic IC, e.g., an application specific integrated circuit (ASIC) or a field programmable gate array (FPGA), or may be implemented in a software manner by a computer, e.g., a digital signal processor (DSP). The functional components may also be implemented by a CPU loading a predetermined program from an auxiliary storage device onto a memory and executing the program on a general-purpose computer, e.g., a personal computer (PC) including the CPU, the memory, the auxiliary storage device, e.g., an HDD or a DVD-ROM, and a communication interface, e.g., a network interface controller (NIC).

Further, this embodiment is described by taking the resolutions of the digital video signal supported by the audio visual equipment 1 are described as resolutions of 1080p, 4K (3G), and 4K (6G), but the present invention is not limited thereto. The present invention can be widely applied to any resolution.

Further, this embodiment is described by taking the audio-visual device 1 including an HDMI input and output interface as an example, but the present invention is not limited thereto. The present invention can be widely applied to audio-visual devices including the input and output interface for an audio-visual signal.

Further, in this embodiment, the contents registered in the fault management table 70 stored in the solution support program storage unit 7 and at least a part of the solution support programs may be provided as a manual in the form of a document.

REFERENCE SIGNS LIST

1: audio-visual device, 2: man-machine interface unit, 3: audio-visual signal input interface unit, 4: audio-visual signal output interface unit, 5: video signal processing unit, 6: audio signal processing unit, 7: solution support program storage unit, 8: log data recording unit, 9: main control unit, 30, 30-1 to 30-$n$: HDMI input portion, 31: DAI input portion, 40, 40-1 to 40-$n$: HDMI output portion, 41: analog output unit, 70: fault management table

The invention claimed is:

1. An audio-visual device of an audio-visual system, the audio-visual device supporting a solution of a fault occurring in the audio-visual system including the audio-visual device, comprising:
   an input and output interface for an audio-visual signal;
   solution support program storage means for storing a plurality of solution support programs for supporting a job of a user for solving a plurality of potential faults occurring in the audio-visual device and in the audio-visual system;
   fault determination means for determining a fault of the plurality of potential faults based on information acquired through the input and output interface;
   a control unit for determining a solution to the fault of the plurality of potential faults based on the information acquired through the input and output interface, wherein the solution is one of the plurality of solution support programs; and a man-machine interface configured for:
outputting a message for prompting the user to conduct a predetermined job, and
outputting a message for prompting the user to form a loop by connecting a cable between an input interface and an output interface for the audio-visual signal, wherein the solution support program storage means contains a fault management table therein, wherein the fault management table contains a record relating to each potential fault, among the plurality of potential faults, registered therein for the each potential fault.

2. The audio-video device of claim 1, wherein the cable is a High-Definition Multimedia Interface (HDMI) cable.

3. The audio-video device of claim 1, wherein:
the message for prompting the user to conduct a predetermined job or
the message for prompting the user to form a loop by connecting a cable between an input interface and an output interface for the audio-visual signal
is to be outputted by being displayed on a display of the man-machine interface.

4. The audio-video device of claim 1, wherein:
the message for prompting the user to conduct a predetermined job or
the message for prompting the user to form a loop by connecting a cable between an input interface and an output interface for the audio-visual signal
is to be outputted by its sound being outputted from a speaker of the man-machine interface.

5. The audio-video device of claim 1, further comprising:
a log data recording unit for recording log data on self-diagnosis processing, the log data to be provided to a customer service.

6. An audio-visual device of an audio-visual system, the audio-visual device supporting a solution of a fault occurring in the audio-visual system including the audio-visual device, comprising:
an input and output interface for an audio-visual signal;
solution support program storage unit for storing, for each potential fault of a plurality of potential faults, at least one solution support program for supporting a job of a user for solving the each potential fault occurring in the audio-visual device and in the audio-visual system;
fault determination means for determining a fault of the plurality of potential faults based on information acquired through the input and output interface;
a control unit for determining a solution to the fault of the plurality of potential faults based on the information acquired through the input and output interface, wherein the solution is one of the plurality of solution support programs;
a man-machine interface configured for:
outputting a message for prompting the user to conduct a predetermined job, and
outputting a message for prompting the user to form a loop by connecting a cable between an input interface and an output interface for the audio-visual signal,
wherein the solution support program storage unit contains a fault management table therein, wherein the fault management table contains a record relating to each potential fault registered therein for the each potential fault.

7. The audio-visual device of claim 6, therein the record includes a field for registering a fault ID for identifying a fault, a field for registering a fault target in which a fault has occurred, and a field for registering a fault detail.

8. The audio-visual device of claim 6, wherein the cable is a High-Definition Multimedia Interface (HDMI) cable.

9. The audio-video device of claim 6, wherein:
the message for prompting the user to conduct a predetermined job or
the message for prompting the user to form a loop by connecting a cable between an input interface and an output interface for the audio-visual signal
is to be outputted by being displayed on a display of the man-machine interface.

10. The audio-video device of claim 6, wherein:
the message for prompting the user to conduct a predetermined job or
the message for prompting the user to form a loop by connecting a cable between an input interface and an output interface for the audio-visual signal
is to be outputted by its sound being outputted from a speaker of the man-machine interface.

11. The audio-video device of claim 6, further comprising:
a log data recording unit for recording log data on self-diagnosis processing, the log data to be provided to a customer service.

12. An audio-visual device of an audio-visual system, the audio-visual device supporting a solution of a fault occurring in the audio-visual system including the audio-visual device, comprising:
an input and output interface for an audio-visual signal;
solution support program storage unit for storing, for each potential fault of a plurality of potential faults, at least one solution support program for supporting a job of a user for solving the each potential fault occurring in the audio-visual device and in the audio-visual system;
fault determination means for determining a fault of the plurality of potential faults based on information acquired through the input and output interface;
a control unit for determining a solution to the fault of the plurality of potential faults based on the information acquired through the input and output interface, wherein the solution is one of the plurality of solution support programs; and
a man-machine interface configured for:
outputting a message for prompting the user to conduct a predetermined job, and
outputting a message for prompting the user to form a loop by connecting a cable between an input interface and an output interface for the audio-visual signal,
wherein the control unit inspects input from the input and output interface and inspects output to the input and output interface when no fault is determined by the fault determination means.

13. The audio-visual device of claim 12, wherein the cable is a High-Definition Multimedia Interface (HDMI) cable.

14. The audio-video device of claim 12, wherein:
the message for prompting the user to conduct a predetermined job or
the message for prompting the user to form a loop by connecting a cable between an input interface and an output interface for the audio-visual signal
is to be outputted by being displayed on a display of the man-machine interface.

15. The audio-video device of claim 12, wherein:
the message for prompting the user to conduct a predetermined job or
the message for prompting the user to form a loop by connecting a cable between an input interface and an output interface for the audio-visual signal
is to be outputted by its sound being outputted from a speaker of the man-machine interface.

16. The audio-video device of claim 12, further comprising:
a log data recording unit for recording log data on self-diagnosis processing, the log data to be provided to a customer service.

17. An audio-visual device of an audio-visual system, the audio-visual device supporting a solution of a fault occurring in the audio-visual system including the audio-visual device, comprising:
an input and output interface for an audio-visual signal;
solution support program storage means for storing a plurality of solution support programs for supporting a job of a user for solving a plurality of potential faults occurring in the audio-visual device and in the audio-visual system;
fault determination means for determining a fault of the plurality of potential faults based on information acquired through the input and output interface;
a control unit for determining a solution to the fault of the plurality of potential faults based on the information acquired through the input and output interface, wherein the solution is one of the plurality of solution support programs; and
a man-machine interface configured for:
outputting a message for prompting the user to conduct a predetermined job, and
outputting a message for prompting the user to form a loop by connecting a cable between an input interface and an output interface for the audio-visual signal,
wherein the control unit inspects input from the input and output interface and inspects output to the input and output interface when no fault is determined by the fault determination means.

18. The audio-video device of claim 17, wherein the cable is a High-Definition Multimedia Interface (HDMI) cable.

19. The audio-video device of claim 17, wherein:
the message for prompting the user to conduct a predetermined job or
the message for prompting the user to form a loop by connecting a cable between an input interface and an output interface for the audio-visual signal
is to be outputted by being displayed on a display of the man-machine interface.

20. The audio-video device of claim 17, wherein:
the message for prompting the user to conduct a predetermined job or
the message for prompting the user to form a loop by connecting a cable between an input interface and an output interface for the audio-visual signal
is to be outputted by its sound being outputted from a speaker of the man-machine interface.

21. The audio-video device of claim 17, further comprising:
a log data recording unit for recording log data on self-diagnosis processing, the log data to be provided to a customer service.

* * * * *